(12) United States Patent
Shukla et al.

(10) Patent No.: US 11,017,779 B2
(45) Date of Patent: May 25, 2021

(54) SYSTEM AND METHOD FOR SPEECH UNDERSTANDING VIA INTEGRATED AUDIO AND VISUAL BASED SPEECH RECOGNITION

(71) Applicant: DMAI, Inc., Los Angeles, CA (US)

(72) Inventors: Nishant Shukla, Hermosa Beach, CA (US); Ashwin Dharne, Irvine, CA (US)

(73) Assignee: DMAI, INC., Los Angeles, CA (US)

( * ) Notice: Subject to any disclaimer, the term of this patent is extended or adjusted under 35 U.S.C. 154(b) by 0 days.

(21) Appl. No.: 16/277,136

(22) Filed: Feb. 15, 2019

(65) Prior Publication Data

US 2019/0279642 A1    Sep. 12, 2019

Related U.S. Application Data

(60) Provisional application No. 62/630,976, filed on Feb. 15, 2018.

(51) Int. Cl.
| | |
|---|---|
| *G10L 15/32* | (2013.01) |
| *G10L 15/02* | (2006.01) |
| *G10L 15/25* | (2013.01) |
| *G10L 15/30* | (2013.01) |
| *G10L 15/22* | (2006.01) |
| *G06K 9/00* | (2006.01) |
| *G10L 13/00* | (2006.01) |

(52) U.S. Cl.
CPC ............... *G10L 15/32* (2013.01); *G06K 9/00* (2013.01); *G10L 15/02* (2013.01); *G10L 15/22* (2013.01); *G10L 15/25* (2013.01); *G10L 15/30* (2013.01); *G10L 13/00* (2013.01); *G10L 2015/025* (2013.01); *G10L 2015/223* (2013.01)

(58) Field of Classification Search
CPC ......... G10L 25/57; G10L 15/00; G10L 15/22; G10L 21/10; G10L 15/16
See application file for complete search history.

(56) References Cited

U.S. PATENT DOCUMENTS

| | | | | |
|---|---|---|---|---|
| 5,608,839 A | * | 3/1997 | Chen ................. | H04N 21/4341 375/E7.083 |
| 6,633,844 B1 | * | 10/2003 | Verma ................. | G10L 15/25 345/441 |

(Continued)

OTHER PUBLICATIONS

International Search Report and Written Opinion dated Apr. 23, 2019 in International Application PCT/US2019/018215.

(Continued)

*Primary Examiner* — Anne L Thomas-Homescu

(74) *Attorney, Agent, or Firm* — Pillsbury Winthrop Shaw Pittman LLP

(57) ABSTRACT

The present teaching relates to method, system, medium, and implementations for speech recognition. An audio signal is received that represents a speech of a user engaged in a dialogue. A visual signal is received that captures the user uttering the speech. A first speech recognition result is obtained by performing audio based speech recognition based on the audio signal. Based on the visual signal, lip movement of the user is detected and a second speech recognition result is obtained by performing lip reading based speech recognition. The first and the second speech recognition results are then integrated to generate an integrated speech recognition result.

15 Claims, 30 Drawing Sheets

(56) References Cited

U.S. PATENT DOCUMENTS

| | | | |
|---|---|---|---|
| 7,149,686 B1* | 12/2006 | Cohen | G10L 15/25 704/241 |
| 7,587,318 B2* | 9/2009 | Seshadri | G10L 15/25 382/116 |
| 8,422,820 B2* | 4/2013 | Zbilut | G06K 9/00523 382/278 |
| 9,094,576 B1* | 7/2015 | Karakotsios | H04N 7/157 |
| 9,922,665 B2* | 3/2018 | Matthews | G10L 21/10 |
| 9,953,637 B1 | 4/2018 | Di Fabbrizio et al. | |
| 10,083,710 B2* | 9/2018 | Chiou | G10L 25/57 |
| 10,665,249 B2 | 5/2020 | Yamaya | |
| 10,878,808 B1 | 12/2020 | Mathias | |
| 10,963,493 B1 | 3/2021 | Hu | |
| 2002/0116197 A1* | 8/2002 | Erten | G06K 9/6293 704/273 |
| 2003/0007609 A1 | 1/2003 | Yuen | |
| 2004/0186718 A1* | 9/2004 | Nefian | G06K 9/6293 704/256 |
| 2005/0027530 A1* | 2/2005 | Fu | G10L 15/24 704/256 |
| 2006/0009978 A1* | 1/2006 | Ma | 704/266 |
| 2006/0290699 A1* | 12/2006 | Dimtrva | H04N 21/42203 345/473 |
| 2007/0186184 A1 | 8/2007 | Berstis | |
| 2008/0111887 A1* | 5/2008 | Cooper | 348/194 |
| 2008/0259085 A1* | 10/2008 | Chen | G06T 13/40 345/473 |
| 2009/0037175 A1 | 2/2009 | Wang | |
| 2010/0042409 A1 | 2/2010 | Hutchinson | |
| 2011/0071830 A1* | 3/2011 | Kim | G06K 9/00335 704/246 |
| 2011/0224978 A1* | 9/2011 | Sawada | G10L 15/32 704/231 |
| 2014/0324648 A1 | 10/2014 | Mori | |
| 2015/0243036 A1 | 8/2015 | Hoffmann | |
| 2016/0078747 A1 | 3/2016 | King | |
| 2016/0163311 A1 | 6/2016 | Crook | |
| 2016/0343389 A1* | 11/2016 | Chiou | G10L 25/57 |
| 2017/0083753 A1 | 3/2017 | Friedland | |
| 2017/0161665 A1 | 6/2017 | Iwata | |
| 2017/0206095 A1 | 7/2017 | Gibbs | |
| 2017/0249504 A1 | 8/2017 | Martinson | |
| 2018/0300310 A1 | 10/2018 | Shinn | |
| 2018/0342239 A1 | 11/2018 | Baughman | |
| 2018/0349108 A1* | 12/2018 | Brebner | G06F 8/34 |
| 2019/0058793 A1 | 2/2019 | Konig | |
| 2019/0066660 A1 | 2/2019 | Liang | |
| 2019/0080252 A1 | 3/2019 | Shinn | |
| 2019/0172240 A1* | 6/2019 | Kitajima | G10L 15/30 |
| 2019/0228107 A1 | 7/2019 | Trim | |
| 2019/0236205 A1 | 8/2019 | Jia | |
| 2019/0341025 A1* | 11/2019 | Omote | G10L 25/30 |
| 2019/0371318 A1* | 12/2019 | Shukla | G10L 15/32 |
| 2019/0379742 A1* | 12/2019 | Simpkinson | G06F 3/01 |
| 2020/0012720 A1 | 1/2020 | Elson | |
| 2020/0126283 A1* | 4/2020 | van Vuuren | G10L 13/00 |
| 2020/0135226 A1* | 4/2020 | Mittal | G06T 7/246 |

OTHER PUBLICATIONS

International Preliminary Report on Patentability dated Aug. 27, 2020 in International Application PCT/US2019/018215.
Notice of Allowance dated Jan. 13, 2021 in U.S. Appl. No. 16/277,535.
Office Action dated Jan. 28, 2021 in U.S. Appl. No. 16/277,032.
Office Action dated Jan. 29, 2021 in U.S. Appl. No. 16/277,469.
Office Action dated Feb. 1, 2021 in U.S. Appl. No. 16/277,505.
Rosani, Andrea et al., "Human Behavior Recognition Using a Context-Free Grammar," Journal of Electronic Imaging, vol. 23.3, 033016-1, May/Jun. 2014.
Liu, Changsong et al., "Learning to Mediate Perceptual Differences in Situated Human-Robot Dialogue", Proceedings of the AAAI Conference on Artificial Intelligence, vol. 29, No. 1, Feb. 19, 2015.
Ryoo, Michael et al., "Recognition of Composite Human Activities through Context-Free Grammar Based Representation," 2006 IEEE Computer Society Conference on Computer Vision and Pattern Recognition (CVPR'06), New York, NY, USA, 2006, pp. 1709-1718, doi: 10.1109/CVPR.2006.242.
Office Action dated Feb. 10, 2021 in U.S. Appl. No. 16/277,337.
Office Action dated Feb. 16, 2021 in U.S. Appl. No. 16/276,950.
Office Action dated Feb. 24, 2021 in U.S. Appl. No. 16/277,381.
Office Action dated Mar. 12, 2021 in U.S. Appl. No. 16/277,418.
Office Action dated Apr. 5, 2021 in U.S. Appl. No. 16/277,271.
Office Action dated Apr. 5, 2021 in U.S. Appl. No. 16/277,301.

* cited by examiner

SYSTEM AND METHOD FOR SPEECH UNDERSTANDING VIA INTEGRATED AUDIO AND VISUAL BASED SPEECH RECOGNITION

CROSS-REFERENCE TO RELATED APPLICATIONS

This application claims priority to U.S. Provisional Patent Application 62/630,976, filed Feb. 15, 2018, the contents of which are incorporated herein by reference in its entirety.

The present application is related to International Application No. PCT/US2019/018281, filed Feb. 15, 2019, U.S. patent application Ser. No. 16/277,599, filed Feb. 15, 2019, International Application No. PCT/US2019/018277, filed Feb. 15, 2019, U.S. patent application Ser. No. 16/277,562, filed Feb. 15, 2019, International Application No. PCT/US2019/018270, filed Feb. 15, 2019, U.S. patent application Ser. No. 16/277,535, filed Feb. 15, 2019, International Application No. PCT/US2019/018253, filed Feb. 15, 2019, U.S. patent application Ser. No. 16/277,469, filed Feb. 15, 2019, International Application No. PCT/US2019/018209, filed Feb. 15, 2019, U.S. patent application Ser. No. 16/276,950, filed Feb. 15, 2019, International Application No. PCT/US2019/018264, filed Feb. 15, 2019, U.S. patent application Ser. No. 16/277,505, filed Feb. 15, 2019, International Application No. PCT/US2019/018212, filed Feb. 15, 2019, U.S. patent application Ser. No. 16/277,032, filed Feb. 15, 2019, International Application No. PCT/US2019/018217, filed Feb. 15, 2019, U.S. patent application Ser. No. 16/277,271, filed Feb. 15, 2019, International Application No. PCT/US2019/018226, filed Feb. 15, 2019, U.S. patent application Ser. No. 16/277,301, filed Feb. 15, 2019, International Application No. PCT/US2019/018235, filed Feb. 15, 2019, U.S. patent application Ser. No. 16/277,337, filed Feb. 15, 2019, International Application No. PCT/US2019/018242, filed Feb. 15, 2019, U.S. patent application Ser. No. 16/277,381, filed Feb. 15, 2019, International Application No. PCT/US2019/018248, filed Feb. 15, 2019, U.S. patent application Ser. No. 16/277,418, filed Feb. 15, 2019, International Application No. PCT/US2019/018215, filed Feb. 15, 2019, which are hereby incorporated by reference in their entireties.

BACKGROUND

1. Technical Field

The present teaching generally relates to computer. More specifically, the present teaching relates to computerized intelligent agent.

2. Technical Background

With advancement of artificial intelligence technologies and the explosion Internet based communications because of the ubiquitous Internet's connectivity, computer aided dialogue systems have become increasingly popular. For example, more and more call centers deploy automated dialogue robot to handle customer calls. Hotels started to install various kiosks that can answer questions from tourists or guests. Online bookings (whether travel accommodations or theater tickets, etc.) are also more frequently done by chatbots. In recent years, automated human machine communications in other areas are also becoming more and more popular.

Such traditional computer aided dialogue systems are usually pre-programmed with certain questions and answers based on commonly known patterns of conversations in different domains. Unfortunately, human conversant can be unpredictable and sometimes does not follow a pre-planned dialogue pattern. In addition, in certain situations, a human conversant may digress during the process and continuing the fixed conversation patterns likely will cause irritation or loss of interests. When this happens, such machine traditional dialogue systems often will not be able to continue to engage a human conversant so that the human machine dialogue either has to be aborted to hand the tasks to a human operator or the human conversant simply leaves the dialogue, which is undesirable.

In addition, traditional machine based dialogue systems are often not designed to address the emotional factor of a human, let alone taking into consideration as to how to address such emotional factor when conversing with a human. For example, a traditional machine dialogue system usually does not initiate the conversation unless a human activates the system or asks some questions. Even if a traditional dialogue system does initiate a conversation, it has a fixed way to start a conversation and does not change from human to human or adjusted based on observations. As such, although they are programmed to faithfully follow the pre-designed dialogue pattern, they are usually not able to act on the dynamics of the conversation and adapt in order to keep the conversation going in a way that can engage the human. In many situations, when a human involved in a dialogue is clearly annoyed or frustrated, a traditional machine dialogue system is completely unaware and continues the conversation in the same manner that has annoyed the human. This not only makes the conversation end unpleasantly (the machine is still unaware of that) but also turns the person away from conversing with any machine based dialogue system in the future.

In some applications, conducting a human machine dialogue session based on what is observed from the human is crucially important in order to determine how to proceed effectively. One example is an education related dialogue. When a chatbot is used for teaching a child to read, whether the child is perceptive to the way he/she is being taught has to be monitored and addressed continuously in order to be effective. Another limitation of the traditional dialogue systems is their context unawareness. For example, a traditional dialogue system is not equipped with the ability to observe the context of a conversation and improvise as to dialogue strategy in order to engage a user and improve the user experience.

Thus, there is a need for methods and systems that address such limitations.

SUMMARY

The teachings disclosed herein relate to methods, systems, and programming for a computerized intelligent agent.

In one example, a method, implemented on a machine having at least one processor, storage, and a communication platform capable of connecting to a network for speech recognition. An audio signal is received that represents a speech of a user engaged in a dialogue. A visual signal is received that captures the user uttering the speech. A first speech recognition result is obtained by performing audio based speech recognition based on the audio signal. Based on the visual signal, lip movement of the user is detected and a second speech recognition result is obtained by performing lip reading based speech recognition. The first and the second speech recognition results are then integrated to generate an integrated speech recognition result.

In a different example, a system for user machine dialogue. The system includes a sensor data collection unit configured for receiving an audio signal representing a speech of a user engaged in a dialogue and a visual signal capturing the user uttering the speech, an audio based speech recognition unit configured for obtaining a first speech recognition result by performing audio based speech recognition based on the audio signal, a lip reading based speech recognizer configured for detecting lip movement of the user based on the visual signal and obtaining a second speech recognition result by performing lip reading based speech recognition, and an audio-visual speech recognition integrator configured for generating an integrated speech recognition result based on the first and second speech recognition results.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for speech recognition, wherein the medium, when read by the machine, causes the machine to perform a series of steps. An audio signal is received that represents a speech of a user engaged in a dialogue. A visual signal is received that captures the user uttering the speech. A first speech recognition result is obtained by performing audio based speech recognition based on the audio signal. Based on the visual signal, lip movement of the user is detected and a second speech recognition result is obtained by performing lip reading based speech recognition. The first and the second speech recognition results are then integrated to generate an integrated speech recognition result.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional human machine dialogue systems and to provide methods and systems that enables a more effective and realistic human to machine dialogue. The present teaching incorporates artificial intelligence in an automated companion with an agent device in conjunction with the backbone support from a user interaction engine so that the automated companion can conduct a dialogue based on continuously monitored multimodal data indicative of the surrounding of the dialogue, adaptively estimating the mindset/emotion/intent of the participants of the dialogue, and adaptively adjust the conversation strategy based on the dynamically changing information/estimates/contextual information.

The automated companion according to the present teaching is capable of personalizing a dialogue by adapting in multiple fronts, including, but is not limited to, the subject matter of the conversation, the hardware/components used to carry out the conversation, and the expression/behavior/gesture used to deliver responses to a human conversant. The adaptive control strategy is to make the conversation more realistic and productive by flexibly changing the conversation strategy based on observations on how receptive the human conversant is to the dialogue. The dialogue system according to the present teaching can be configured to achieve a goal driven strategy, including dynamically configuring hardware/software components that are considered most appropriate to achieve an intended goal. Such optimizations are carried out based on learning, including learning from prior conversations as well as from an on-going conversation by continuously assessing a human conversant's behavior/reactions during the conversation with respect to some intended goals. Paths exploited to achieve a goal driven strategy may be determined to remain the human conversant engaged in the conversation even though in some instances, paths at some moments of time may appear to be deviating from the intended goal.

Figure 1:
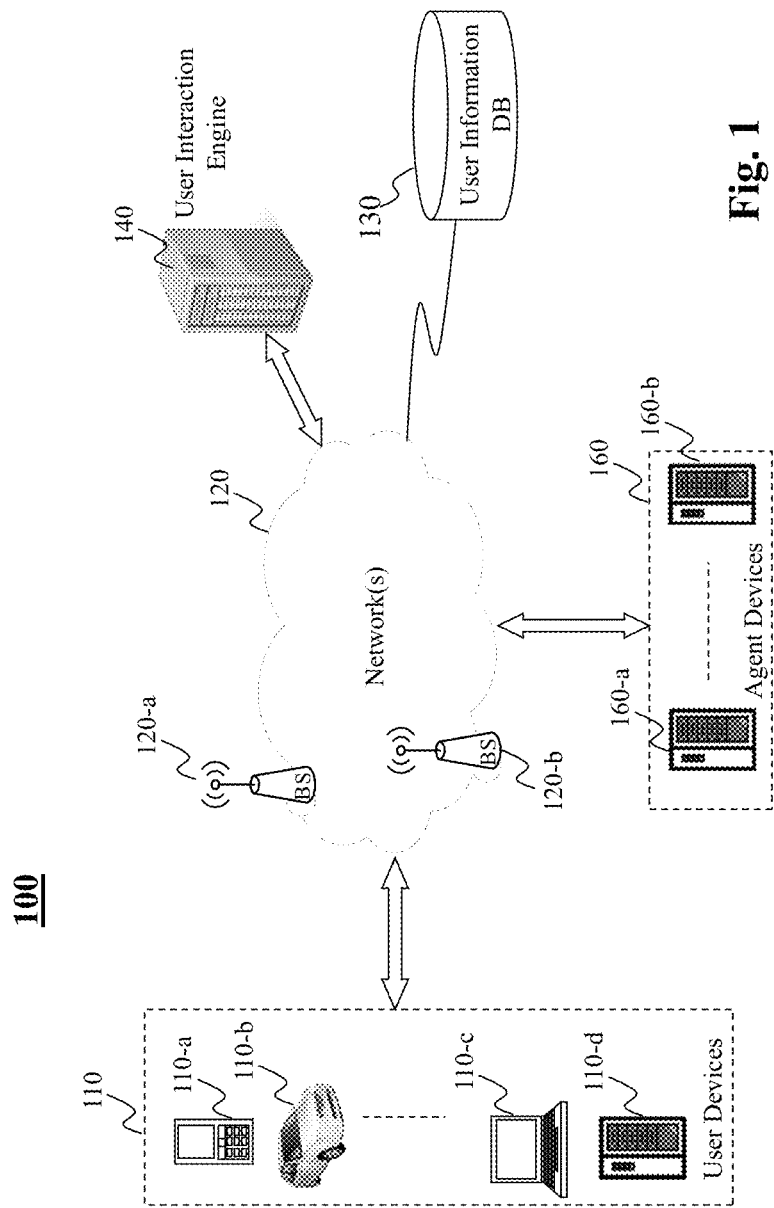
FIG. 1 depicts a networked environment for facilitating a dialogue between a user operating a user device and an agent device in conjunction with a user interaction engine, in accordance with an embodiment of the present teaching.

More specifically, the present teaching discloses a user interaction engine providing backbone support to an agent device to facilitate more realistic and more engaging dialogues with a human conversant. FIG. 1 depicts a networked environment 100 for facilitating a dialogue between a user operating a user device and an agent device in conjunction with a user interaction engine, in accordance with an embodiment of the present teaching. In FIG. 1, the exemplary networked environment 100 includes one or more user devices 110, such as user devices 110-*a*, 110-*b*, 110-*c*, and 110-*d*, one or more agent devices 160, such as agent devices 160-*a*, . . . 160-*b*, a user interaction engine 140, and a user information database 130, each of which may communicate with one another via network 120. In some embodiments, network 120 may correspond to a single network or a combination of different networks. For example, network 120 may be a local area network ("LAN"), a wide area network ("WAN"), a public network, a proprietary network, a proprietary network, a Public Telephone Switched Network ("PSTN"), the Internet, an intranet, a Bluetooth network, a wireless network, a virtual network, and/or any combination thereof. In one embodiment, network 120 may also include various network access points. For example, environment 100 may include wired or wireless access points such as, without limitation, base stations or Internet exchange points 120-*a*, . . . , 120-*b*. Base stations 120-*a* and 120-*b* may facilitate, for example, communications to/from user devices 110 and/or agent devices 160 with one or more other components in the networked framework 100 across different types of network.

A user device, e.g., 110-*a*, may be of different types to facilitate a user operating the user device to connect to network 120 and transmit/receive signals. Such a user device 110 may correspond to any suitable type of electronic/computing device including, but not limited to, a desktop computer (110-*d*), a mobile device (110-*a*), a device incorporated in a transportation vehicle (110-*b*), . . . , a mobile computer (110-*c*), or a stationary device/computer (110-*d*). A mobile device may include, but is not limited to, a mobile phone, a smart phone, a personal display device, a personal digital assistant ("PDAs"), a gaming console/device, a wearable device such as a watch, a Fitbit, a pin/broach, a headphone, etc. A transportation vehicle embedded with a device may include a car, a truck, a motorcycle, a boat, a ship, a train, or an airplane. A mobile computer may include a laptop, an Ultrabook device, a handheld device, etc. A stationary device/computer may include a television, a set top box, a smart household device (e.g., a refrigerator, a microwave, a washer or a dryer, an electronic assistant, etc.), and/or a smart accessory (e.g., a light bulb, a light switch, an electrical picture frame, etc.).

An agent device, e.g., any of 160-*a*, . . . , 160-*b*, may correspond one of different types of devices that may communicate with a user device and/or the user interaction engine 140. Each agent device, as described in greater detail below, may be viewed as an automated companion device that interfaces with a user with, e.g., the backbone support from the user interaction engine 140. An agent device as described herein may correspond to a robot which can be a game device, a toy device, a designated agent device such as a traveling agent or weather agent, etc. The agent device as disclosed herein is capable of facilitating and/or assisting in interactions with a user operating user device. In doing so, an agent device may be configured as a robot capable of controlling some of its parts, via the backend support from the application server 130, for, e.g., making certain physical movement (such as head), exhibiting certain facial expression (such as curved eyes for a smile), or saying things in a certain voice or tone (such as exciting tones) to display certain emotions.

When a user device (e.g., user device 110-a) is connected to an agent device, e.g., 160-a (e.g., via either a contact or contactless connection), a client running on a user device, e.g., 110-a, may communicate with the automated companion (either the agent device or the user interaction engine or both) to enable an interactive dialogue between the user operating the user device and the agent device. The client may act independently in some tasks or may be controlled remotely by the agent device or the user interaction engine 140. For example, to respond to a question from a user, the agent device or the user interaction engine 140 may control the client running on the user device to render the speech of the response to the user. During a conversation, an agent device may include one or more input mechanisms (e.g., cameras, microphones, touch screens, buttons, etc.) that allow the agent device to capture inputs related to the user or the local environment associated with the conversation. Such inputs may assist the automated companion to develop an understanding of the atmosphere surrounding the conversation (e.g., movements of the user, sound of the environment) and the mindset of the human conversant (e.g., user picks up a ball which may indicates that the user is bored) in order to enable the automated companion to react accordingly and conduct the conversation in a manner that will keep the user interested and engaging.

In the illustrated embodiments, the user interaction engine 140 may be a backend server, which may be centralized or distributed. It is connected to the agent devices and/or user devices. It may be configured to provide backbone support to agent devices 160 and guide the agent devices to conduct conversations in a personalized and customized manner. In some embodiments, the user interaction engine 140 may receive information from connected devices (either agent devices or user devices), analyze such information, and control the flow of the conversations by sending instructions to agent devices and/or user devices. In some embodiments, the user interaction engine 140 may also communicate directly with user devices, e.g., providing dynamic data, e.g., control signals for a client running on a user device to render certain responses.

Generally speaking, the user interaction engine 140 may control the state and the flow of conversations between users and agent devices. The flow of each of the conversations may be controlled based on different types of information associated with the conversation, e.g., information about the user engaged in the conversation (e.g., from the user information database 130), the conversation history, surround information of the conversations, and/or the real time user feedbacks. In some embodiments, the user interaction engine 140 may be configured to obtain various sensory inputs such as, and without limitation, audio inputs, image inputs, haptic inputs, and/or contextual inputs, process these inputs, formulate an understanding of the human conversant, accordingly generate a response based on such understanding, and control the agent device and/or the user device to carry out the conversation based on the response. As an illustrative example, the user interaction engine 140 may receive audio data representing an utterance from a user operating user device, and generate a response (e.g., text) which may then be delivered to the user in the form of a computer generated utterance as a response to the user. As yet another example, the user interaction engine 140 may also, in response to the utterance, generate one or more instructions that control an agent device to perform a particular action or set of actions.

As illustrated, during a human machine dialogue, a user, as the human conversant in the dialogue, may communicate across the network 120 with an agent device or the user interaction engine 140. Such communication may involve data in multiple modalities such as audio, video, text, etc. Via a user device, a user can send data (e.g., a request, audio signal representing an utterance of the user, or a video of the scene surrounding the user) and/or receive data (e.g., text or audio response from an agent device). In some embodiments, user data in multiple modalities, upon being received by an agent device or the user interaction engine 140, may be analyzed to understand the human user's speech or gesture so that the user's emotion or intent may be estimated and used to determine a response to the user.

Figure 2A:
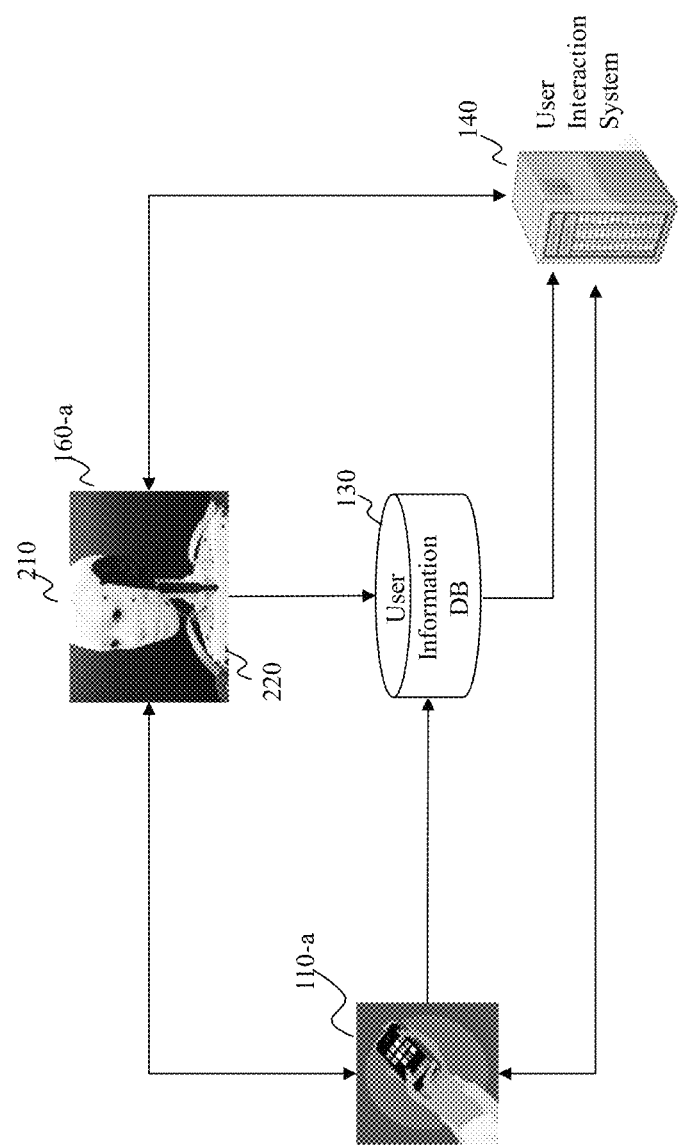
FIGS. 2A-2B depict connections among a user device, an agent device, and a user interaction engine during a dialogue, in accordance with an embodiment of the present teaching.

FIG. 2A depicts specific connections among a user device 110-a, an agent device 160-a, and the user interaction engine 140 during a dialogue, in accordance with an embodiment of the present teaching. As seen, connections between any two of the parties may all be bi-directional, as discussed herein. The agent device 160-a may interface with the user via the user device 110-a to conduct a dialogue in a bi-directional communication. On one hand, the agent device 160-a may be controlled by the user interaction engine 140 to utter a response to the user operating the user device 110-a. On the other hand, inputs from the user site, including, e.g., both the user's utterance or action as well as information about the surrounding of the user, are provided to the agent device via the connections. The agent device 160-a may be configured to process such input and dynamically adjust its response to the user. For example, the agent device may be instructed by the user interaction engine 140 to render a tree on the user device. Knowing that the surrounding environment of the user (based on visual information from the user device) shows green trees and lawns, the agent device may customize the tree to be rendered as a lush green tree. If the scene from the user site shows that it is a winter weather, the agent device may control to render the tree on the user device with parameters for a tree that has no leaves. As another example, if the agent device is instructed to render a duck on the user device, the agent device may retrieve information from the user information database 130 on color preference and generate parameters for customizing the duck in a user's preferred color before sending the instruction for the rendering to the user device.

In some embodiments, such inputs from the user's site and processing results thereof may also be transmitted to the user interaction engine 140 for facilitating the user interaction engine 140 to better understand the specific situation associated with the dialogue so that the user interaction engine 140 may determine the state of the dialogue, emotion/mindset of the user, and to generate a response that is based on the specific situation of the dialogue and the intended purpose of the dialogue (e.g., for teaching a child the English vocabulary). For example, if information received from the user device indicates that the user appears to be bored and become impatient, the user interaction engine 140 may determine to change the state of dialogue to a topic that is of interest of the user (e.g., based on the information from the user information database 130) in order to continue to engage the user in the conversation.

In some embodiments, a client running on the user device may be configured to be able to process raw inputs of different modalities acquired from the user site and send the processed information (e.g., relevant features of the raw inputs) to the agent device or the user interaction engine for further processing. This will reduce the amount of data transmitted over the network and enhance the communication efficiency. Similarly, in some embodiments, the agent device may also be configured to be able to process information from the user device and extract useful information for, e.g., customization purposes. Although the user interaction engine 140 may control the state and flow control of the dialogue, making the user interaction engine 140 light weight improves the user interaction engine 140 scale better.

Figure 2B:
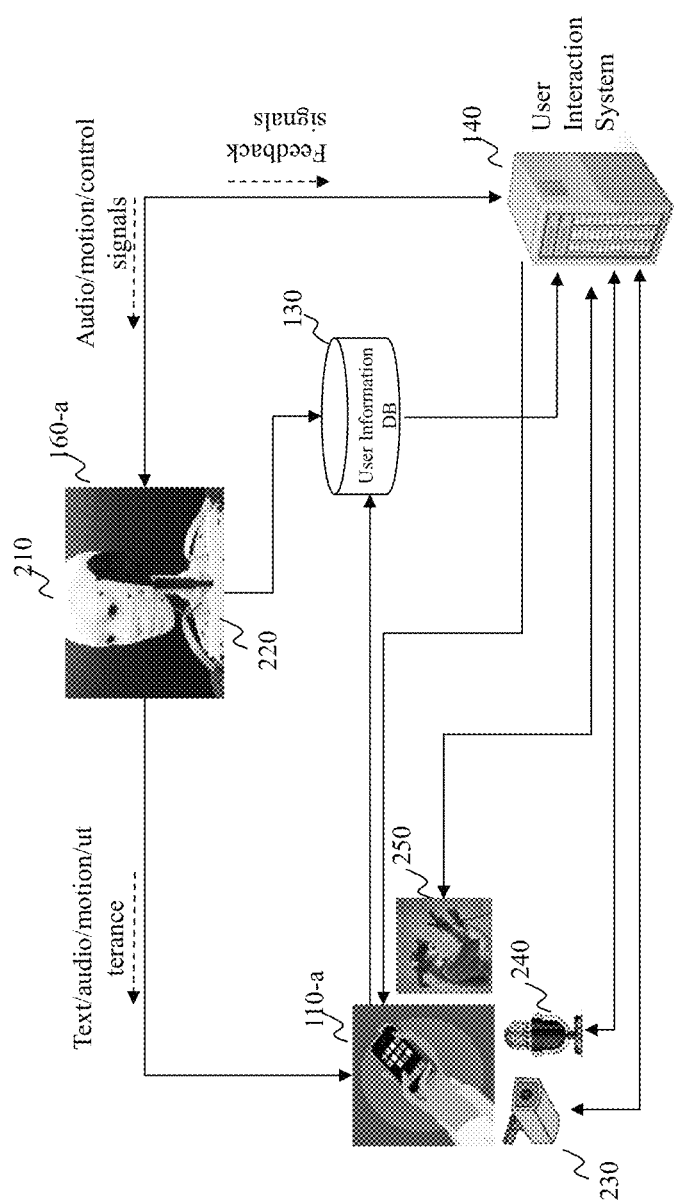

FIG. 2B depicts the same setting as what is presented in FIG. 2A with additional details on the user device 110-a. As shown, during a dialogue between the user and the agent 210, the user device 110-a may continually collect multi-modal sensor data related to the user and his/her surroundings, which may be analyzed to detect any information related to the dialogue and used to intelligently control the dialogue in an adaptive manner. This may further enhance the user experience or engagement. FIG. 2B illustrates exemplary sensors such as video sensor 230, audio sensor 240, . . . , or haptic sensor 250. The user device may also send textual data as part of the multi-model sensor data. Together, these sensors provide contextual information surrounding the dialogue and can be used for the user interaction engine 140 to understand the situation in order to manage the dialogue. In some embodiment, the multi-modal sensor data may first be processed on the user device and important features in different modalities may be extracted and sent to the user interaction engine 140 so that dialogue may be controlled with an understanding of the context. In some embodiments, the raw multi-modal sensor data may be sent directly to the user interaction engine 140 for processing.

Figure 3A:
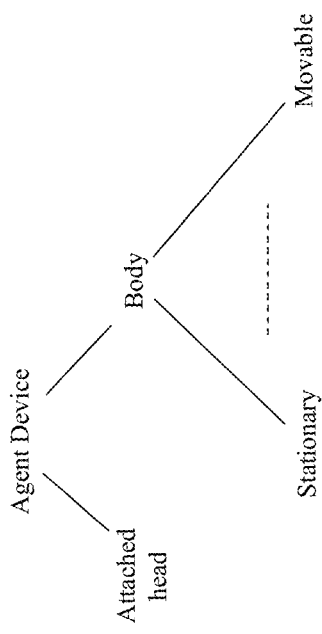
FIG. 3A illustrates an exemplary structure of an agent device with exemplary types of agent body, in accordance with an embodiment of the present teaching.

As seen in FIGS. 2A-2B, the agent device may correspond to a robot that has different parts, including its head 210 and its body 220. Although the agent device as illustrated in FIGS. 2A-2B appears to be a person robot, it may also be constructed in other forms as well, such as a duck, a bear, a rabbit, etc. FIG. 3A illustrates an exemplary structure of an agent device with exemplary types of agent body, in accordance with an embodiment of the present teaching. As presented, an agent device may include a head and a body with the head attached to the body. In some embodiments, the head of an agent device may have additional parts such as face, nose and mouth, some of which may be controlled to, e.g., make movement or expression. In some embodiments, the face on an agent device may correspond to a display screen on which a face can be rendered and the face may be of a person or of an animal. Such displayed face may also be controlled to express emotion.

The body part of an agent device may also correspond to different forms such as a duck, a bear, a rabbit, etc. The body of the agent device may be stationary, movable, or semi-movable. An agent device with stationary body may correspond to a device that can sit on a surface such as a table to conduct face to face conversation with a human user sitting next to the table. An agent device with movable body may correspond to a device that can move around on a surface such as table surface or floor. Such a movable body may include parts that can be kinematically controlled to make physical moves. For example, an agent body may include feet which can be controlled to move in space when needed. In some embodiments, the body of an agent device may be semi-movable, i.e., some parts are movable and some are not. For example, a tail on the body of an agent device with a duck appearance may be movable but the duck cannot move in space. A bear body agent device may also have arms that may be movable but the bear can only sit on a surface.

Figure 3B:
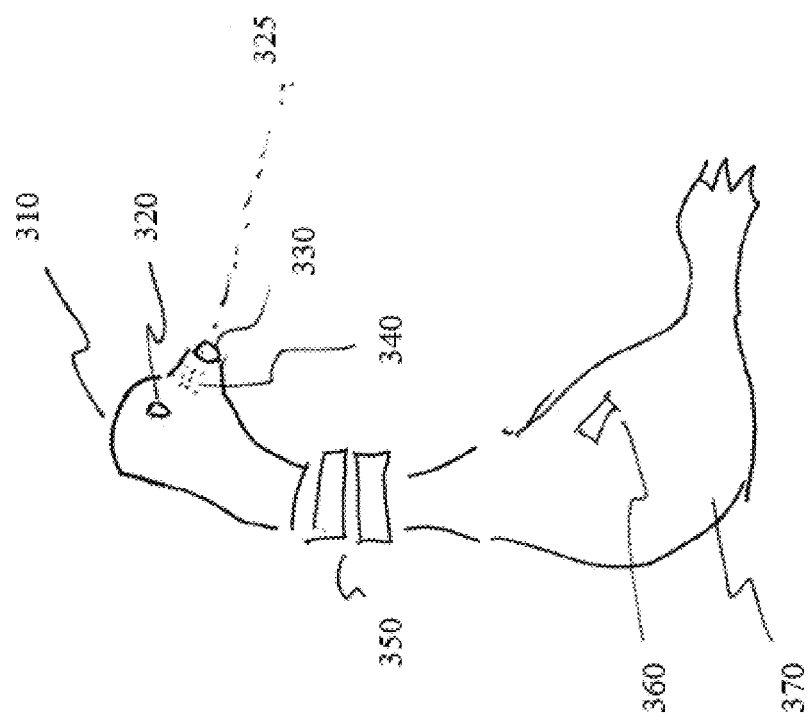
FIG. 3B illustrates an exemplary agent device, in accordance with an embodiment of the present teaching.

FIG. 3B illustrates an exemplary agent device or automated companion 160-a, in accordance with an embodiment of the present teaching. The automated companion 160-a is a device that interacts with people using speech and/or facial expression or physical gestures. For example, the automated companion 160-a corresponds to an animatronic peripheral device with different parts, including head portion 310, eye portion (cameras) 320, a mouth portion with laser 325 and a microphone 330, a speaker 340, neck portion with servos 350, one or more magnet or other components that can be used for contactless detection of presence 360, and a body portion corresponding to, e.g., a charge base 370. In operation, the automated companion 160-a may be connected to a user device which may include a mobile multi-function device (110-a) via network connections. Once connected, the automated companion 160-a and the user device interact with each other via, e.g., speech, motion, gestures, and/or via pointing with a laser pointer.

Other exemplary functionalities of the automated companion 160-a may include reactive expressions in response to a user's response via, e.g., an interactive video cartoon character (e.g., avatar) displayed on, e.g., a screen as part of a face on the automated companion. The automated companion may use a camera (320) to observe the user's presence, facial expressions, direction of gaze, surroundings, etc. An animatronic embodiment may "look" by pointing its head (310) containing a camera (320), "listen" using its microphone (340), "point" by directing its head (310) that can move via servos (350). In some embodiments, the head of the agent device may also be controlled remotely by a, e.g., the user interaction engine 140 or by a client in a user device (110-a), via a laser (325). The exemplary automated companion 160-a as shown in FIG. 3B may also be controlled to "speak" via a speaker (330).

Figure 4A:
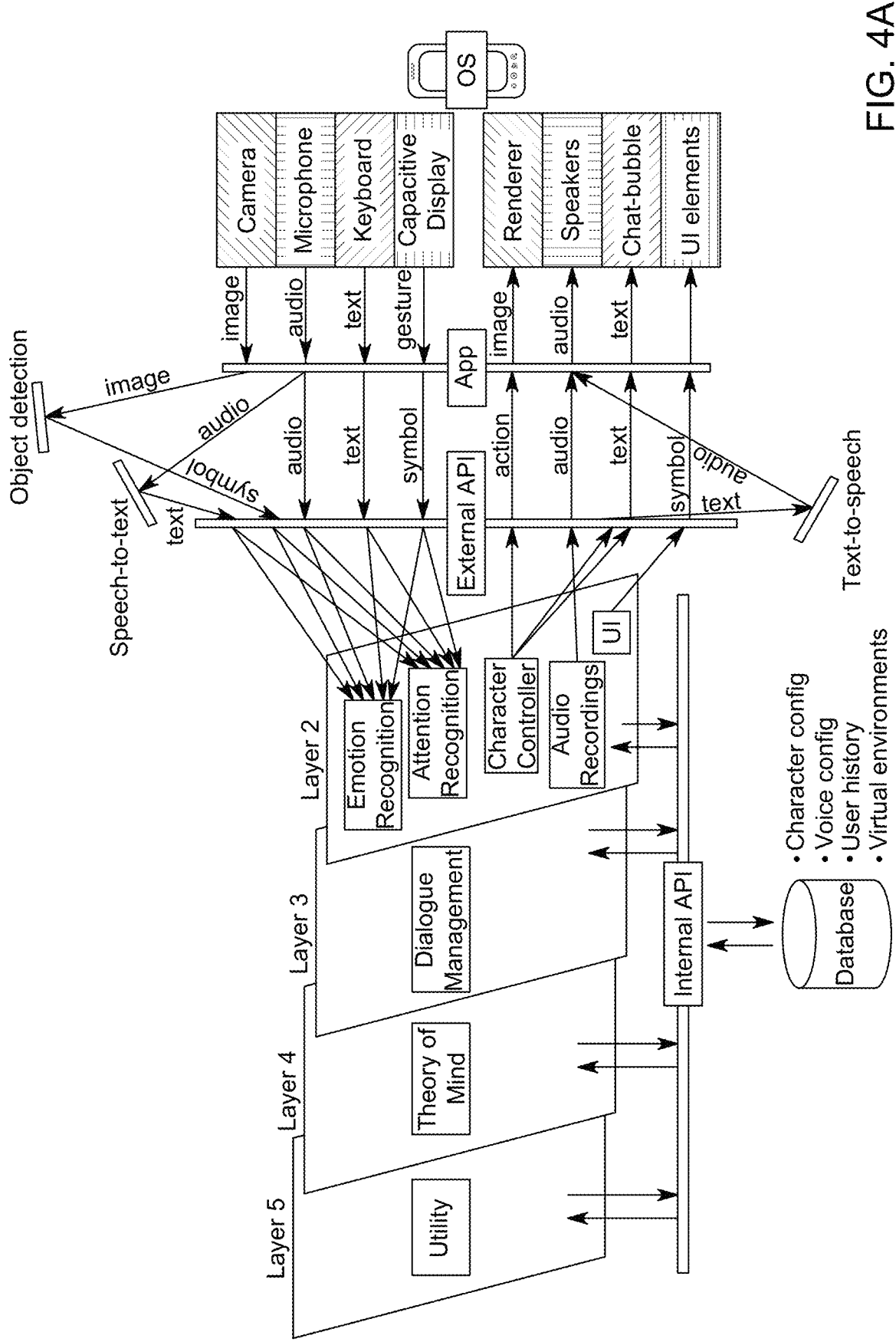
FIG. 4A depicts an exemplary high level system diagram for an overall system for the automated companion, according to various embodiments of the present teaching.

FIG. 4A depicts an exemplary high level system diagram for an overall system for the automated companion, according to various embodiments of the present teaching. In this illustrated embodiment, the overall system may encompass components/function modules residing in a user device, an agent device, and the user interaction engine 140. The overall system as depicted herein comprises a plurality of layers of processing and hierarchies that together carries out human-machine interactions in an intelligent manner. In the illustrated embodiment, there are 5 layers, including layer 1 for front end application as well as front end multi-modal data processing, layer 2 for characterizations of the dialog setting, layer 3 is where the dialog management module resides, layer 4 for estimated mindset of different parties (human, agent, device, etc.), layer 5 for so called utility. Different layers may correspond different levels of processing, ranging from raw data acquisition and processing at layer 1 to layer 5 on processing changing utilities of participants of dialogues.

The term "utility" is hereby defined as preferences of a party identified based on states detected associated with dialogue histories. Utility may be associated with a party in a dialogue, whether the party is a human, the automated companion, or other intelligent devices. A utility for a particular party may represent different states of a world, whether physical, virtual, or even mental. For example, a state may be represented as a particular path along which a dialog walks through in a complex map of the world. At different instances, a current state evolves into a next state based on the interaction between multiple parties. States may also be party dependent, i.e., when different parties participate in an interaction, the states arising from such interaction may vary. A utility associated with a party may be organized as a hierarchy of preferences and such a hierarchy of preferences may evolve over time based on the party's choices made and likings exhibited during conversations. Such preferences, which may be represented as an ordered sequence of choices made out of different options, is what is referred to as utility. The present teaching discloses method and system by which an intelligent automated companion is capable of learning, through a dialogue with a human conversant, the user's utility.

Within the overall system for supporting the automated companion, front end applications as well as front end multi-modal data processing in layer 1 may reside in a user device and/or an agent device. For example, the camera, microphone, keyboard, display, renderer, speakers, chatbubble, and user interface elements may be components or functional modules of the user device. For instance, there may be an application or client running on the user device which may include the functionalities before an external application interface (API) as shown in FIG. 4A. In some embodiments, the functionalities beyond the external API may be considered as the backend system or reside in the user interaction engine 140. The application running on the user device may take multi-model data (audio, images, video, text) from the sensors or circuitry of the user device, process the multi-modal data to generate text or other types of signals (object such as detected user face, speech understanding result) representing features of the raw multi-modal data, and send to layer 2 of the system.

In layer 1, multi-modal data may be acquired via sensors such as camera, microphone, keyboard, display, speakers, chat bubble, renderer, or other user interface elements. Such multi-modal data may be analyzed to estimated or infer various features that may be used to infer higher level characteristics such as expression, characters, gesture, emotion, action, attention, intent, etc. Such higher level characteristics may be obtained by processing units at layer 2 and the used by components of higher layers, via the internal API as shown in FIG. 4A, to e.g., intelligently infer or estimate additional information related to the dialogue at higher conceptual levels. For example, the estimated emotion, attention, or other characteristics of a participant of a dialogue obtained at layer 2 may be used to estimate the mindset of the participant. In some embodiments, such mindset may also be estimated at layer 4 based on additional information, e.g., recorded surrounding environment or other auxiliary information in such surrounding environment such as sound.

The estimated mindsets of parties, whether related to humans or the automated companion (machine), may be relied on by the dialogue management at layer 3, to determine, e.g., how to carry on a conversation with a human conversant. How each dialogue progresses often represent a human user's preferences. Such preferences may be captured dynamically during the dialogue at utilities (layer 5). As shown in FIG. 4A, utilities at layer 5 represent evolving states that are indicative of parties' evolving preferences, which can also be used by the dialogue management at layer 3 to decide the appropriate or intelligent way to carry on the interaction.

Sharing of information among different layers may be accomplished via APIs. In some embodiments as illustrated in FIG. 4A, information sharing between layer 1 and rest of the layers is via an external API while sharing information among layers 2-5 is via an internal API. It is understood that this merely a design choice and other implementations are also possible to realize the present teaching presented herein. In some embodiments, through the internal API, various layers (2-5) may access information created by or stored at other layers to support the processing. Such information may include common configuration to be applied to a dialogue (e.g., character of the agent device is an avatar, voice preferred, or a virtual environment to be created for the dialogue, etc.), a current state of the dialogue, a current dialogue history, known user preferences, estimated user intent/emotion/mindset, etc. In some embodiments, some information that may be shared via the internal API may be accessed from an external database. For example, certain configurations related to a desired character for the agent device (a duck) may be accessed from, e.g., an open source database, that provide parameters (e.g., parameters to visually render the duck and/or parameters needed to render the speech from the duck).

Figure 4B:
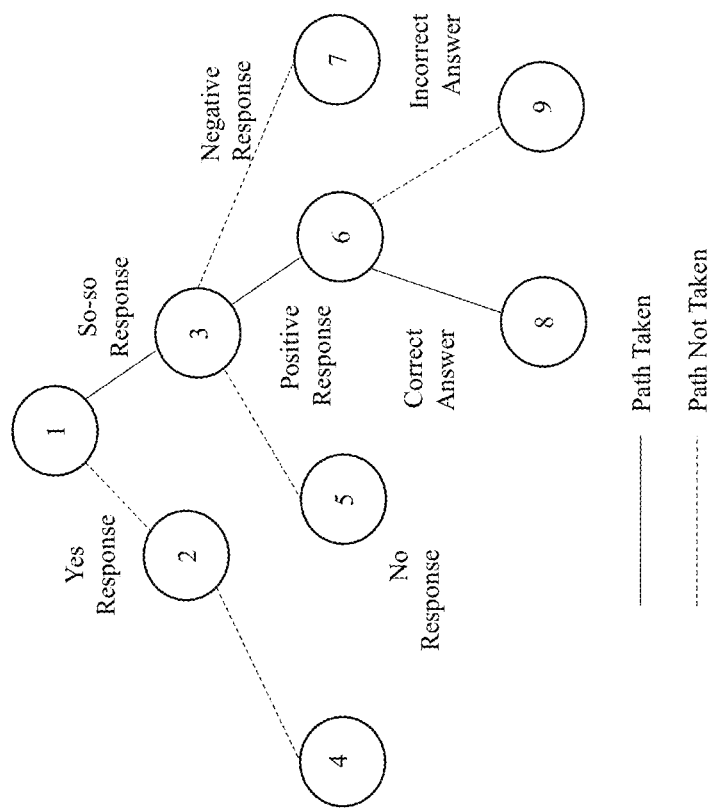
FIG. 4B illustrates a part of a dialogue tree of an on-going dialogue with paths taken based on interactions between the automated companion and a user, according to an embodiment of the present teaching.

FIG. 4B illustrates a part of a dialogue tree of an on-going dialogue with paths taken based on interactions between the automated companion and a user, according to an embodiment of the present teaching. In this illustrated example, the dialogue management at layer 3 (of the automated companion) may predict multiple paths with which a dialogue, or more generally an interaction, with a user may proceed. In this example, each node may represent a point of the current state of the dialogue and each branch from a node may represent possible responses from a user. As shown in this example, at node 1, the automated companion may face with three separate paths which may be taken depending on a response detected from a user. If the user responds with an affirmative response, dialogue tree 400 may proceed from node 1 to node 2. At node 2, a response may be generated for the automated companion in response to the affirmative response from the user and may then be rendered to the user, which may include audio, visual, textual, haptic, or any combination thereof.

If, at node 1, the user responses negatively, the path is for this stage is from node 1 to node 10. If the user responds, at node 1, with a "so-so" response (e.g., not negative but also not positive), dialogue tree 400 may proceed to node 3, at which a response from the automated companion may be rendered and there may be three separate possible responses from the user, "No response," "Positive Response," and "Negative response," corresponding to nodes 5, 6, and 7, respectively. Depending on the user's actual response with respect to the automated companion's response rendered at node 3, the dialogue management at layer 3 may then follow the dialogue accordingly. For instance, if the user responds at node 3 with a positive response, the automated companion moves to respond to the user at node 6. Similarly, depending on the user's reaction to the automated companion's response at node 6, the user may further respond with an answer that is correct. In this case, the dialogue state moves from node 6 to node 8, etc. In this illustrated example, the dialogue state during this period moved from node 1, to node 3, to node 6, and to node 8. The traverse through nodes 1, 3, 6, and 8 forms a path consistent with the underlying conversation between the automated companion and a user. As seen in FIG. 4B, the path representing the dialogue is represented by the solid lines connecting nodes 1, 3, 6, and 8, whereas the paths skipped during a dialogue is represented by the dashed lines.

Figure 4C:
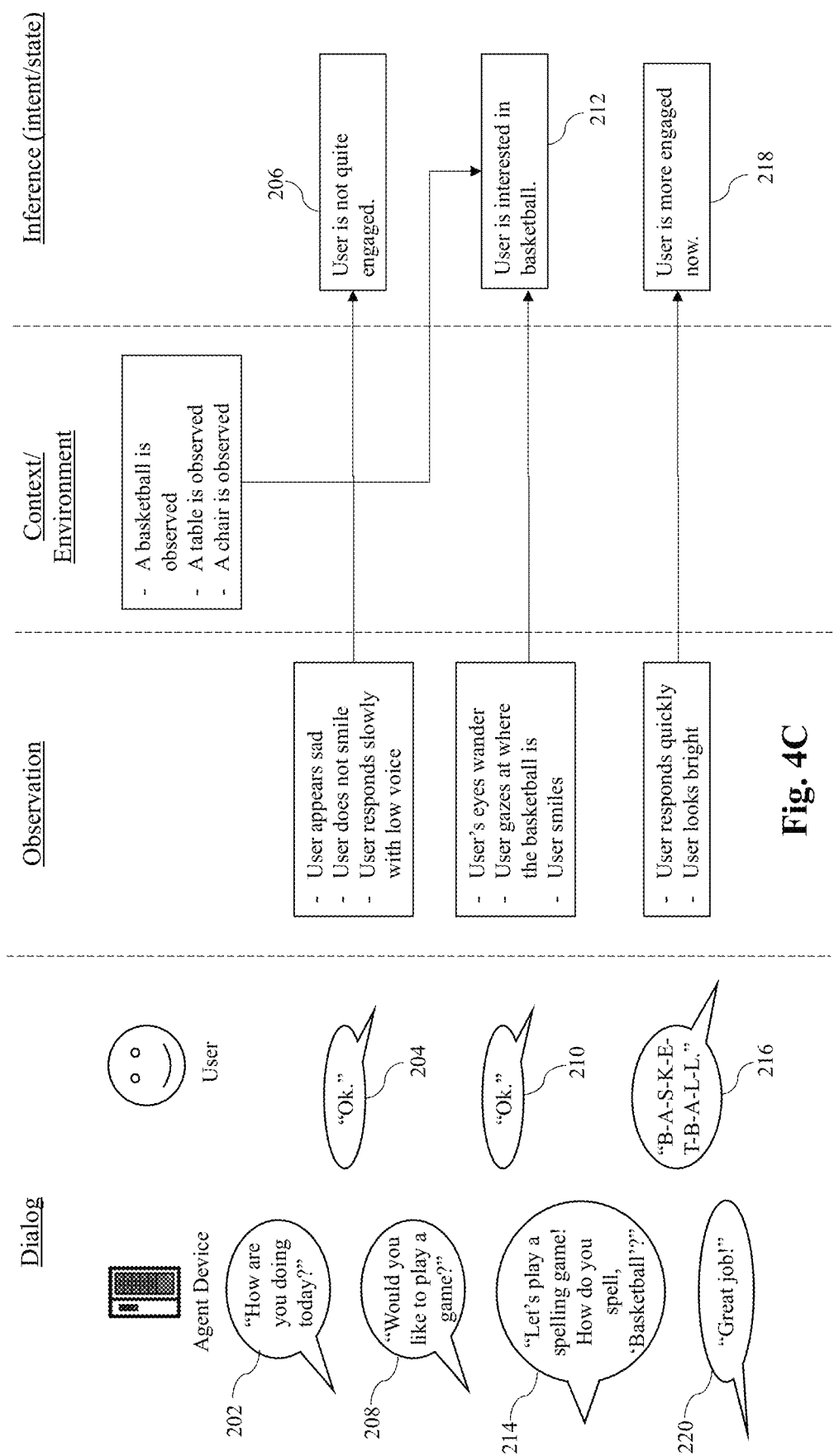
FIG. 4C illustrates exemplary a human-agent device interaction and exemplary processing performed by the automated companion, according to an embodiment of the present teaching.

FIG. 4C illustrates exemplary a human-agent device interaction and exemplary processing performed by the automated companion, according to an embodiment of the present teaching. As seen from FIG. 4C, operations at different layers may be conducted and together they facilitate intelligent dialogue in a cooperated manner. In the illustrated example, an agent device may first ask a user "How are you doing today?" at 402 to initiate a conversation. In response to utterance at 402, the user may respond with utterance "Ok" at 404. To manage the dialogue, the automated companion may activate different sensors during the dialogue to make observation of the user and the surrounding environment. For example, the agent device may acquire multi-modal data about the surrounding environment where the user is in. Such multi-modal data may include audio, visual, or text data. For example, visual data may capture the facial expression of the user. The visual data may also reveal contextual information surrounding the scene of the conversation. For instance, a picture of the scene may reveal that there is a basketball, a table, and a chair, which provides information about the environment and may be leveraged in dialogue management to enhance engagement of the user. Audio data may capture not only the speech response of the user but also other peripheral information such as the tone of the response, the manner by which the user utters the response, or the accent of the user.

Based on acquired multi-modal data, analysis may be performed by the automated companion (e.g., by the front end user device or by the backend user interaction engine 140) to assess the attitude, emotion, mindset, and utility of the users. For example, based on visual data analysis, the automated companion may detect that the user appears sad, not smiling, the user's speech is slow with a low voice. The characterization of the user's states in the dialogue may be performed at layer 2 based on multi-model data acquired at layer 1. Based on such detected observations, the automated companion may infer (at 406) that the user is not that interested in the current topic and not that engaged. Such inference of emotion or mental state of the user may, for instance, be performed at layer 4 based on characterization of the multi-modal data associated with the user.

To respond to the user's current state (not engaged), the automated companion may determine to perk up the user in order to better engage the user. In this illustrated example, the automated companion may leverage what is available in the conversation environment by uttering a question to the user at 408: "Would you like to play a game?" Such a question may be delivered in an audio form as speech by converting text to speech, e.g., using customized voices individualized for the user. In this case, the user may respond by uttering, at 410, "Ok." Based on the continuously acquired multi-model data related to the user, it may be observed, e.g., via processing at layer 2, that in response to the invitation to play a game, the user's eyes appear to be wandering, and in particular that the user's eyes may gaze towards where the basketball is located. At the same time, the automated companion may also observe that, once hearing the suggestion to play a game, the user's facial expression changes from "sad" to "smiling." Based on such observed characteristics of the user, the automated companion may infer, at 412, that the user is interested in basketball.

Based on the acquired new information and the inference based on that, the automated companion may decide to leverage the basketball available in the environment to make the dialogue more engaging for the user yet still achieving the educational goal for the user. In this case, the dialogue management at layer 3 may adapt the conversion to talk about a game and leverage the observation that the user gazed at the basketball in the room to make the dialogue more interesting to the user yet still achieving the goal of, e.g., educating the user. In one example embodiment, the automated companion generates a response, suggesting the user to play a spelling game" (at 414) and asking the user to spell the word "basketball."

Given the adaptive dialogue strategy of the automated companion in light of the observations of the user and the environment, the user may respond providing the spelling of word "basketball." (at 416). Observations are continuously made as to how enthusiastic the user is in answering the spelling question. If the user appears to respond quickly with a brighter attitude, determined based on, e.g., multi-modal data acquired when the user is answering the spelling question, the automated companion may infer, at 418, that the user is now more engaged. To further encourage the user to actively participate in the dialogue, the automated companion may then generate a positive response "Great job!" with instruction to deliver this response in a bright, encouraging, and positive voice to the user.

Figure 5:
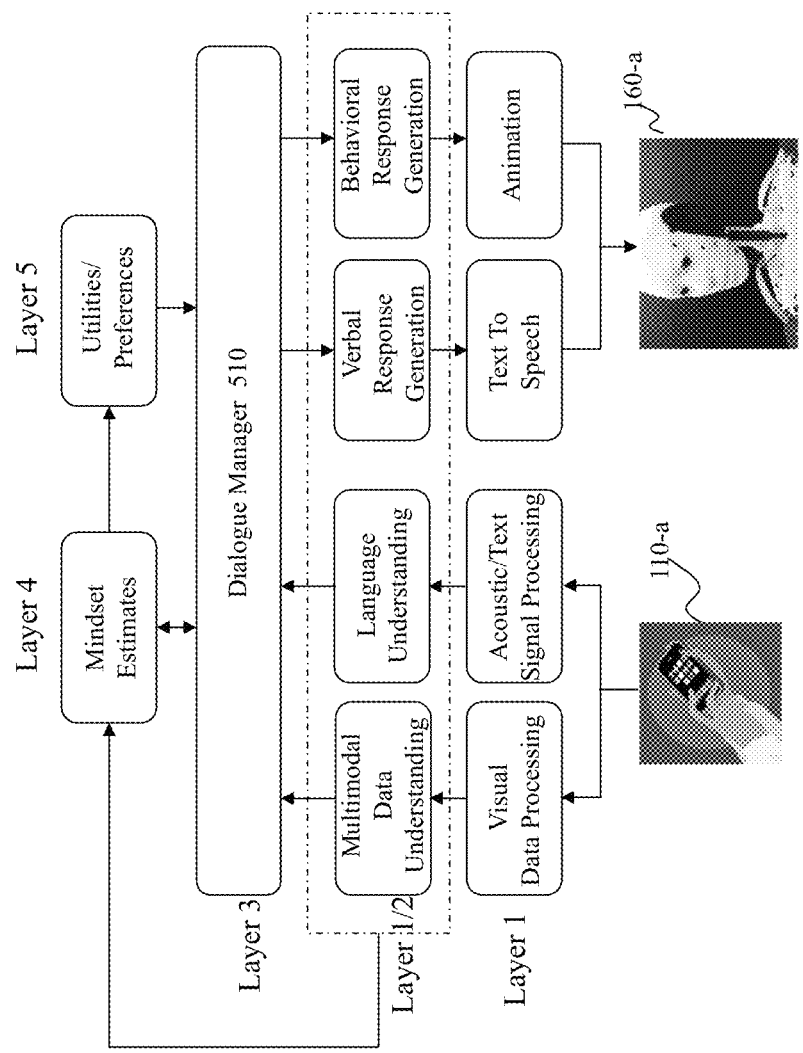
FIG. 5 illustrates exemplary multiple layer processing and communications among different processing layers of an automated dialogue companion, according to an embodiment of the present teaching.

FIG. 5 illustrates exemplary communications among different processing layers of an automated dialogue companion centered around a dialogue manager 510, according to various embodiments of the present teaching. The dialogue manager 510 in FIG. 5 corresponds to a functional component of the dialogue management at layer 3. A dialog manager is an important part of the automated companion and it manages dialogues. Traditionally, a dialogue manager takes in as input a user's utterances and determine how to respond to the user. This is performed without taking into account the user's preferences, user's mindset/emotions/intent, or surrounding environment of the dialogue, i.e., given any weights to the different available states of the relevant world. The lack of an understanding of the surrounding world often limits the perceived authenticity of or engagement in the conversations between a human user and an intelligent agent.

In some embodiments of the present teaching, the utility of parties of a conversation relevant to an on-going dialogue is exploited to allow a more personalized, flexible, and engaging conversion to be carried out. It facilitates an intelligent agent acting in different roles to become more effective in different tasks, e.g., scheduling appointments, booking travel, ordering equipment and supplies, and researching online on various topics. When an intelligent agent is aware of a user's dynamic mindset, emotions, intent, and/or utility, it enables the agent to engage a human conversant in the dialogue in a more targeted and effective way. For example, when an education agent teaches a child, the preferences of the child (e.g., color he loves), the emotion observed (e.g., sometimes the child does not feel like continue the lesson), the intent (e.g., the child is reaching out to a ball on the floor instead of focusing on the lesson) may all permit the education agent to flexibly adjust the focus subject to toys and possibly the manner by which to continue the conversation with the child so that the child may be given a break in order to achieve the overall goal of educating the child.

As another example, the present teaching may be used to enhance a customer service agent in its service by asking questions that are more appropriate given what is observed in real-time from the user and hence achieving improved user experience. This is rooted in the essential aspects of the present teaching as disclosed herein by developing the means and methods to learn and adapt preferences or mindsets of parties participating in a dialogue so that the dialogue can be conducted in a more engaging manner.

Dialogue manager (DM) 510 is a core component of the automated companion. As shown in FIG. 5, DM 510 (layer 3) takes input from different layers, including input from layer 2 as well as input from higher levels of abstraction such as layer 4 for estimating mindsets of parties involved in a dialogue and layer 5 that learns utilities/preferences based on dialogues and assessed performances thereof. As illustrated, at layer 1, multi-modal information is acquired from sensors in different modalities which is processed to, e.g., obtain features that characterize the data. This may include signal processing in visual, acoustic, and textual modalities.

Such multi-modal information may be acquired by sensors deployed on a user device, e.g., 110-*a* during the dialogue. The acquired multi-modal information may be related to the user operating the user device 110-*a* and/or the surrounding of the dialogue scene. In some embodiments, the multi-model information may also be acquired by an agent device, e.g., 160-*a*, during the dialogue. In some embodiments, sensors on both the user device and the agent device may acquire relevant information. In some embodiments, the acquired multi-model information is processed at Layer 1, as shown in FIG. 5, which may include both a user device and an agent device. Depending on the situation and configuration, Layer 1 processing on each device may differ. For instance, if a user device 110-*a* is used to acquire surround information of a dialogue, including both information about the user and the environment around the user, raw input data (e.g., text, visual, or audio) may be processed on the user device and then the processed features may then be sent to Layer 2 for further analysis (at a higher level of abstraction). If some of the multi-modal information about the user and the dialogue environment is acquired by an agent device, the processing of such acquired raw data may also be processed by the agent device (not shown in FIG. 5) and then features extracted from such raw data may then be sent from the agent device to Layer 2 (which may be located in the user interaction engine 140).

Layer 1 also handles information rendering of a response from the automated dialogue companion to a user. In some embodiments, the rendering is performed by an agent device, e.g., 160-*a* and examples of such rendering include speech, expression which may be facial or physical acts performed. For instance, an agent device may render a text string received from the user interaction engine 140 (as a response to the user) to speech so that the agent device may utter the response to the user. In some embodiments, the text string may be sent to the agent device with additional rendering instructions such as volume, tone, pitch, etc. which may be used to convert the text string into a sound wave corresponding to an utterance of the content in a certain manner. In some embodiments, a response to be delivered to a user may also include animation, e.g., utter a response with an attitude which may be delivered via, e.g., a facial expression or a physical act such as raising one arm, etc. In some embodiments, the agent may be implemented as an application on a user device. In this situation, rendering of a response from the automated dialogue companion is implemented via the user device, e.g., 110-*a* (not shown in FIG. 5).

Processed features of the multi-modal data may be further processed at layer 2 to achieve language understanding and/or multi-modal data understanding including visual, textual, and any combination thereof. Some of such understanding may be directed to a single modality, such as speech understanding, and some may be directed to an understanding of the surrounding of the user engaging in a dialogue based on integrated information. Such understanding may be physical (e.g., recognize certain objects in the scene), perceivable (e.g., recognize what the user said, or certain significant sound, etc.), or mental (e.g., certain emotion such as stress of the user estimated based on, e.g., the tune of the speech, a facial expression, or a gesture of the user).

The multimodal data understanding generated at layer 2 may be used by DM 510 to determine how to respond. To enhance engagement and user experience, the DM 510 may also determine a response based on the estimated mindsets of the user and of the agent from layer 4 as well as the utilities of the user engaged in the dialogue from layer 5. The mindsets of the parties involved in a dialogue may be estimated based on information from Layer 2 (e.g., estimated emotion of a user) and the progress of the dialogue. In some embodiments, the mindsets of a user and of an agent may be estimated dynamically during the course of a dialogue and such estimated mindsets may then be used to learn, together with other data, utilities of users. The learned utilities represent preferences of users in different dialogue scenarios and are estimated based on historic dialogues and the outcomes thereof.

In each dialogue of a certain topic, the dialogue manager 510 bases its control of the dialogue on relevant dialogue tree(s) that may or may not be associated with the topic (e.g., may inject small talks to enhance engagement). To generate a response to a user in a dialogue, the dialogue manager 510 may also consider additional information such as a state of the user, the surrounding of the dialogue scene, the emotion of the user, the estimated mindsets of the user and the agent, and the known preferences of the user (utilities).

An output of DM 510 corresponds to an accordingly determined response to the user. To deliver a response to the user, the DM 510 may also formulate a way that the response is to be delivered. The form in which the response is to be delivered may be determined based on information from multiple sources, e.g., the user's emotion (e.g., if the user is a child who is not happy, the response may be rendered in a gentle voice), the user's utility (e.g., the user may prefer speech in certain accent similar to his parents'), or the surrounding environment that the user is in (e.g., noisy place so that the response needs to be delivered in a high volume). DM 510 may output the response determined together with such delivery parameters.

In some embodiments, the delivery of such determined response is achieved by generating the deliverable form(s) of each response in accordance with various parameters associated with the response. In a general case, a response is delivered in the form of speech in some natural language. A response may also be delivered in speech coupled with a particular nonverbal expression as a part of the delivered response, such as a nod, a shake of the head, a blink of the eyes, or a shrug. There may be other forms of deliverable form of a response that is acoustic but not verbal, e.g., a whistle.

To deliver a response, a deliverable form of the response may be generated via, e.g., verbal response generation and/or behavior response generation, as depicted in FIG. 5. Such a response in its determined deliverable form(s) may then be used by a renderer to actual render the response in its intended form(s). For a deliverable form in a natural language, the text of the response may be used to synthesize a speech signal via, e.g., text to speech techniques, in accordance with the delivery parameters (e.g., volume, accent, style, etc.). For any response or part thereof, that is to be delivered in a non-verbal form(s), e.g., with a certain expression, the intended non-verbal expression may be translated into, e.g., via animation, control signals that can be used to control certain parts of the agent device (physical representation of the automated companion) to perform certain mechanical movement to deliver the non-verbal expression of the response, e.g., nodding head, shrug shoulders, or whistle. In some embodiments, to deliver a response, certain software components may be invoked to render a different facial expression of the agent device. Such rendition(s) of the response may also be simultaneously carried out by the agent (e.g., speak a response with a joking voice and with a big smile on the face of the agent).

Figure 6:
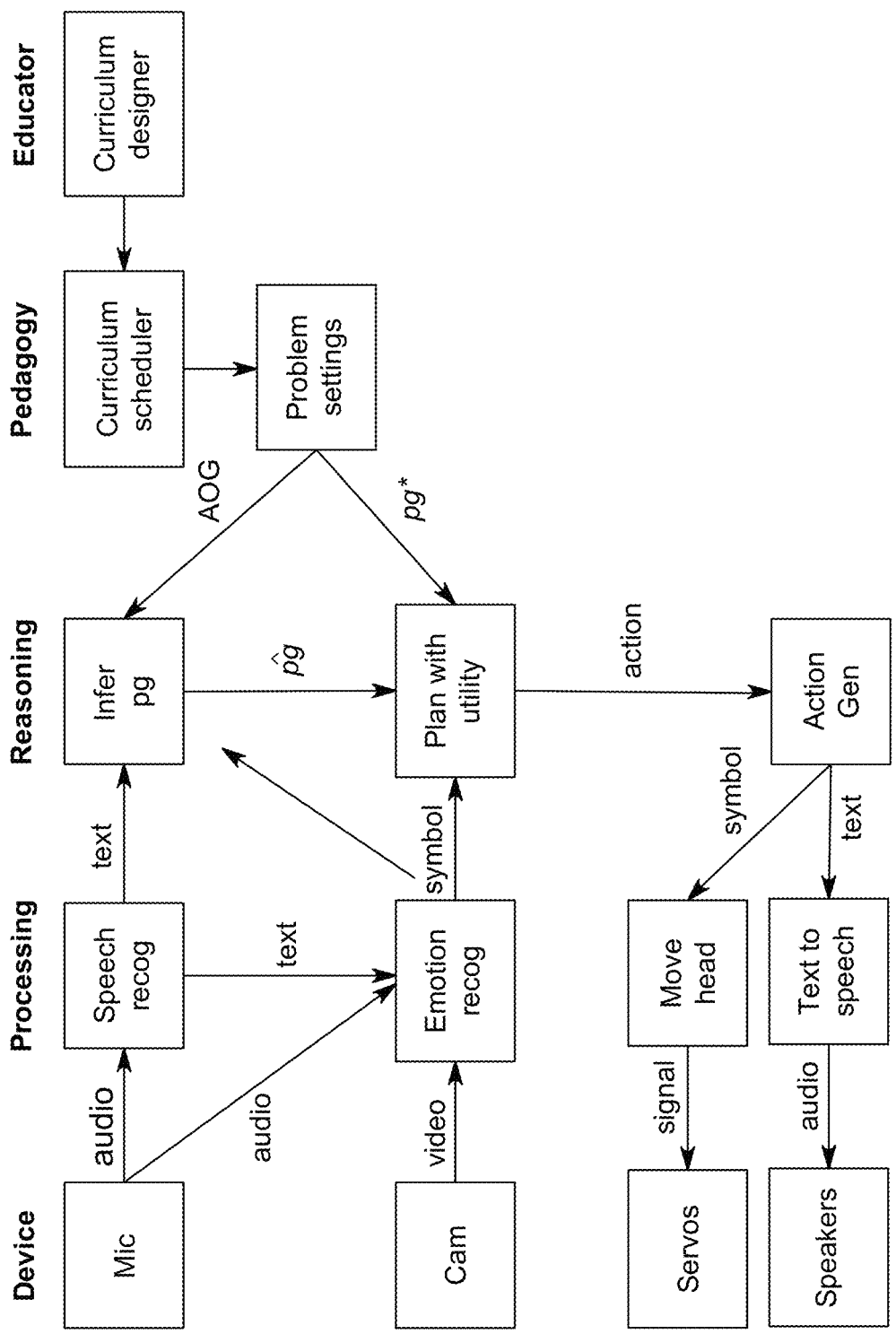
FIG. 6 depicts an exemplary high level system framework for an artificial intelligence based educational companion, according to an embodiment of the present teaching.

FIG. 6 depicts an exemplary high level system diagram for an artificial intelligence based educational companion, according to various embodiments of the present teaching. In this illustrated embodiment, there are five levels of processing, namely device level, processing level, reasoning level, pedagogy or teaching level, and educator level. The device level comprising sensors such as microphone and camera or media delivery devices such as servos to move, e.g., body parts of a robot or speakers to deliver dialogue content. The processing level comprises various processing components directed to processing of different types of signals, which include both input and output signals.

On the input side, the processing level may include speech processing module for performing, e.g., speech recognition based on audio signal obtained from an audio sensor (microphone) to understand what is being uttered in order to determine how to respond. The audio signal may also be recognized to generate text information for further analysis. The audio signal from the audio sensor may also be used by an emotion recognition processing module. The emotion recognition module may be designed to recognize various emotions of a party based on both visual information from a camera and the synchronized audio information. For instance, a happy emotion may often be accompanied with a smile face and a certain acoustic cue. The text information obtained via speech recognition may also be used by the emotion recognition module, as a part of the indication of the emotion, to estimate the emotion involved.

On the output side of the processing level, when a certain response strategy is determined, such strategy may be translated into specific actions to take by the automated companion to respond to the other party. Such action may be carried out by either deliver some audio response or express certain emotion or attitude via certain gesture. When the response is to be delivered in audio, text with words that need to be spoken are processed by a text to speech module to produce audio signals and such audio signals are then sent to the speakers to render the speech as a response. In some embodiments, the speech generated based on text may be performed in accordance with other parameters, e.g., that may be used to control to generate the speech with certain tones or voices. If the response is to be delivered as a physical action, such as a body movement realized on the automated companion, the actions to be taken may also be instructions to be used to generate such body movement. For example, the processing level may include a module for moving the head (e.g., nodding, shaking, or other movement of the head) of the automated companion in accordance with some instruction (symbol). To follow the instruction to move the head, the module for moving the head may generate electrical signal, based on the instruction, and send to servos to physically control the head movement.

The third level is the reasoning level, which is used to perform high level reasoning based on analyzed sensor data. Text from speech recognition, or estimated emotion (or other characterization) may be sent to an inference program which may operate to infer various high level concepts such as intent, mindset, preferences based on information received from the second level. The inferred high level concepts may then be used by a utility based planning module that devises a plan to respond in a dialogue given the teaching plans defined at the pedagogy level and the current state of the user. The planned response may then be translated into an action to be performed to deliver the planned response. The action is then further processed by an action generator to specifically direct to different media platform to carry out the intelligent response.

The pedagogy and educator levels both related to the educational application as disclosed. The educator level includes activities related to designing curriculums for different subject matters. Based on designed curriculum, the pedagogy level includes a curriculum scheduler that schedules courses based on the designed curriculum and based on the curriculum schedule, the problem settings module may arrange certain problems settings be offered based on the specific curriculum schedule. Such problem settings may be used by the modules at the reasoning level to assist to infer the reactions of the users and then plan the response accordingly based on utility and inferred state of mind.

As discussed herein, during a dialogue session with a user, speech from the user needs to be recognized in order for the dialog manager 510 to determine how to respond to the user in order to continue to drive the conversation. The present teaching further discloses approaches to address several challenges in speech recognition in user machine dialogues. For example, a user may be in a dialogue environment with multiple people present. In such situations, speech recognition may need to be performed with respect to specific users, e.g., a user whose lip is moving or a user that the automated dialogue companion has been speaking with. According to the present teaching, in such a situation, the automated dialogue companion may discern the source or direction of the sound representing speech prior to performing speech recognition to figure out what is spoken. In some situations, in a noisy dialogue environment, such as a classroom or beach, reliably recognizing the utterance of a user may also pose a challenge. The present teaching discloses an integrated approach to speech recognition by combining information from acoustic signals and information from visual observation such as lip movement to enhance the recognition quality. Another practical challenge to speech recognition in user machine dialogues is to determine the language in which the user is speaking in order for the automated dialogue companion to determine a recognition strategy, e.g., which speech recognition model to be used, to understand the user's utterances and determine responses thereof.

Figure 7A:
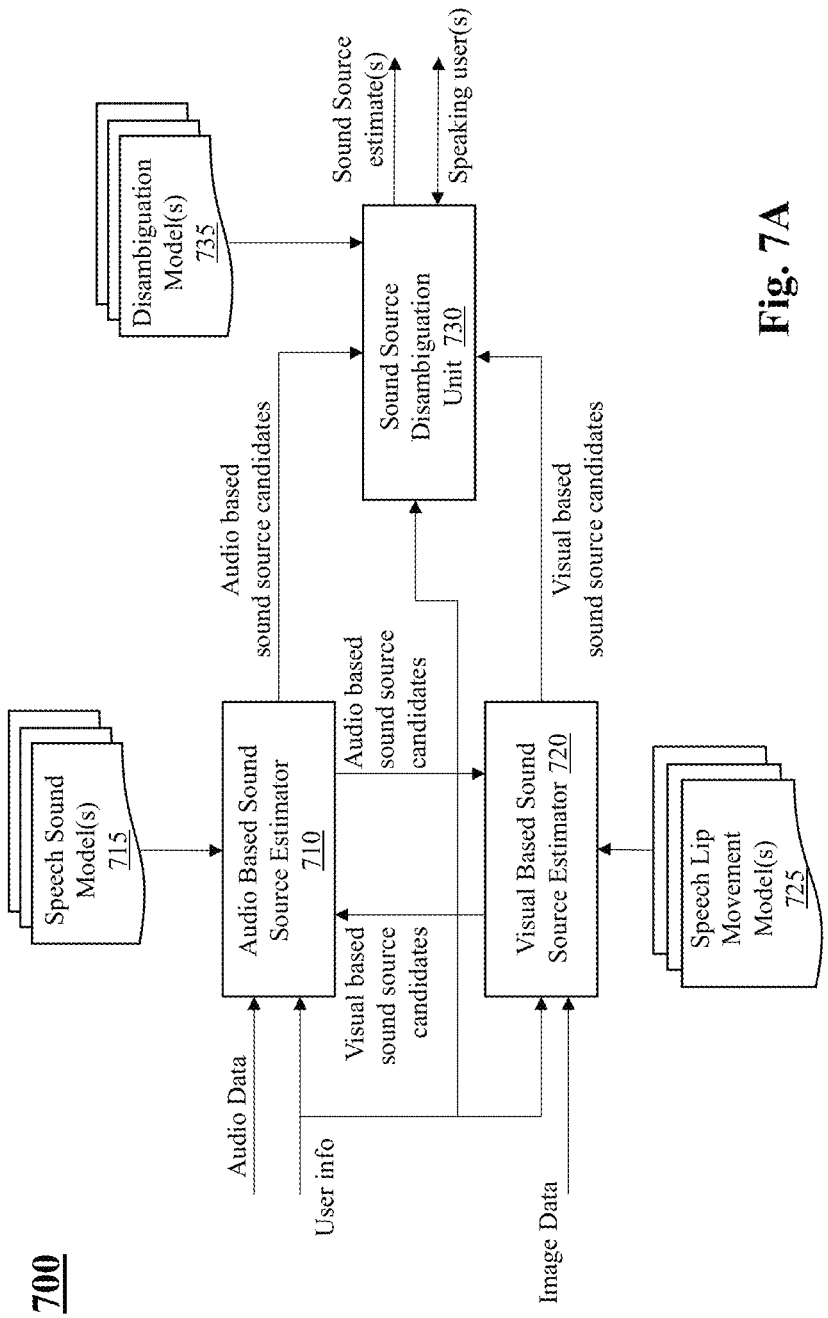
FIG. 7A depicts an exemplary scheme of estimating a source of sound, according to some embodiments of the present teaching.

To address the first challenge of ascertaining a source or spatial direction of speech, FIG. 7 depicts an exemplary high level system mechanism 700 for detecting the source of speech, according to some embodiments of the present teaching. As illustrated, mechanism 700 adopts an integrated approach for detecting a source of a speech by combining visual and audio cues. Mechanism 700 includes an audio based sound source estimator 710, a visual based sound source estimator 720, and sound source disambiguation unit 730. In this illustrated embodiment, the audio based sound source estimator 710 is provided for estimating one or more candidate sources (directions) of speech sound in a dialogue scene based on acoustic cues. The audio based sound source estimator 710 processes audio data collected from a dialogue scene and estimates one or more sound sources (for speech) based on sound models 715 (e.g., acoustic models for human speech). The visual based sound source estimator 720 is provided for estimating one or more candidate sources (directions in a dialogue scene) of speech activities in a dialogue scene based on visual cues. The visual based sound source estimator 720 processes image data collected from the dialogue scene, analyzes the visual information based on speech lip movement models 725 (e.g., visual models for lip movement in speech in certain languages), and estimates candidate sound source(s) where the human speech is occurring. The audio based sound source candidates estimated by the audio based sound source estimator 710 and the visual based sound source estimates from 720 are sent, respectively, to the sound source disambiguation unit 730 so that the estimated sound candidates determined based on different cues may be disambiguated to generate estimated source(s) of sound in a dialogue environment.

Figure 7B:
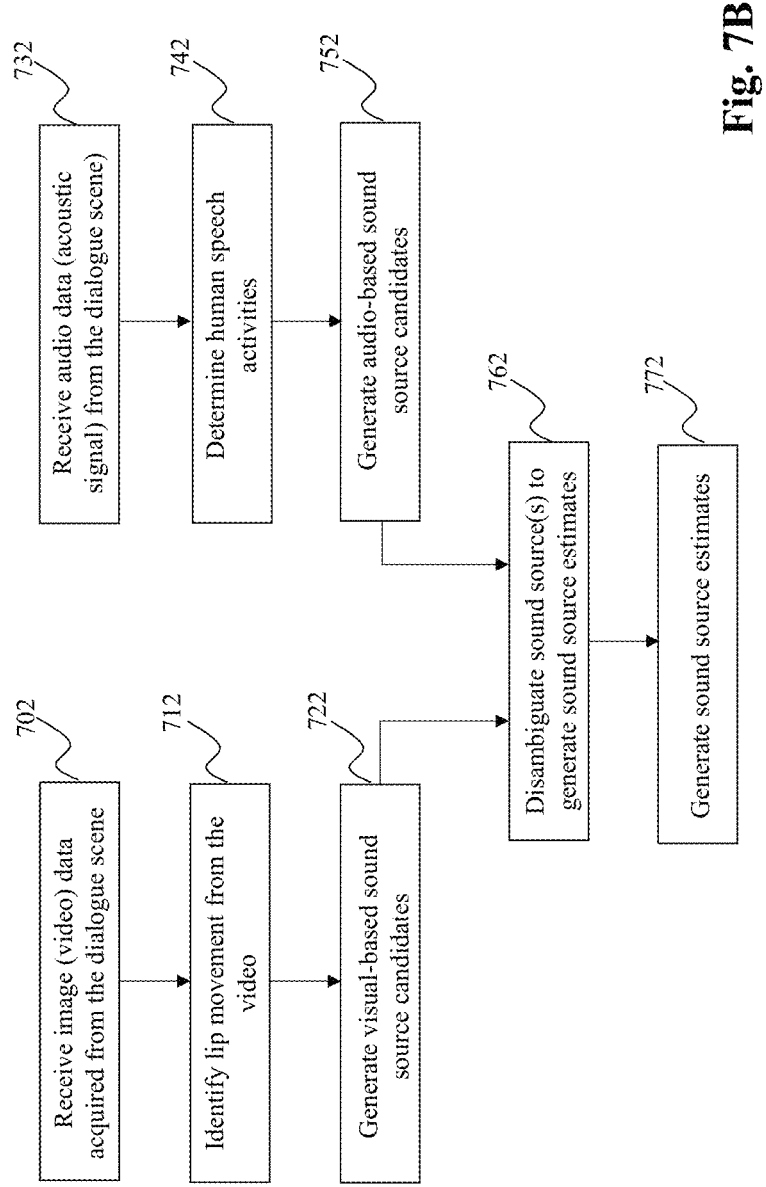
FIG. 7B is a flowchart of an exemplary process for estimating a source of sound, according to some embodiments of the present teaching.

FIG. 7B is a flowchart of an exemplary flow for estimating source(s) of sound corresponding to human speech, according to some embodiments of the present teaching. As discussed herein, the present teaching adopts an integrated approach by combining audio and video cues, including audio cues that reveal human speech activities and video cues related to lip movement that evidences human speech. In operation, the visual based sound source estimator 720 receives, at 702 of FIG. 7B, image (video) data acquired from the dialogue scene and processes the video data to detect, at 712, lip movement based on speech lip movement models 725 for recognizing speech activities. In some embodiments, the speech lip movement models to be used for the detection may be selected with respect to a certain language. As will be discussed later in the present teaching, which language a user is speaking may be initially determined based on multi-model based automatic speech recognition (ASR) and such detected information may be used to guide the selection of an appropriate speech lip movement model(s) for the detected language for lip movement detection.

In some embodiments, to determine speech activities in a certain language based on lip movement, the visual based sound source estimator 720 may detect first human faces present in the dialogue scene and then detect the lip for each detected face. Based on the detected lips, movement of the lips are tracked and analyzed based on speech lip movement model(s) 725 selected with respect to a certain language. Based on the detected lip movement, the visual based sound source estimator 720 generates, at 722, visual based sound source candidate(s). Each of the candidate source of sound may be represented by a set of parameters, e.g., the direction or spatial location of the sound in the dialogue scene, some characterization of the person corresponding to the sound source (e.g., whether it is a male or female), or whether the person is the user the automated dialogue companion has been talking with.

In some embodiments, the visual based estimation may also rely on some additional cues related to, e.g., the on-going dialogue. For instance, if a user engaged in the dialogue has been previously tracked in a video, such tracked user information may be used by the visual based sound source estimator 720 to further ascertain the source of the sound of the user, e.g., when the user is moving around in the dialogue scene. This is shown in FIG. 7, where the visual based sound source estimator 720 takes user information as input in its estimation. For instance, based on the tracked user information, the lip movement of the user may be detected based on the tracked, e.g., face of the user. If there is no lip movement from the user, it may not matter whether there is speech from other people resent in the scene. That is, in this case, when the focal point is the user, the tracked user information may also be used to filter out other possible sound sources, e.g., the sound from other locations may not be relevant to the dialogue. In some embodiments, in estimating sound source based on visual cues, to enhance estimation quality, the visual based sound source estimator 720 may utilize audio cues such as the sound source estimates from the audio based sound source estimator 710. This is shown in FIG. 7, where the visual based sound source estimator 720 takes audio based sound source estimate(s) from 710. In some embodiments, each estimated sound source determined based on visual cues may be associated with a confidence score. If a similar sound source is also estimated based on audio cues, this may enhance the confidence score of the estimate from the visual cues.

In parallel, the audio based sound source estimator 710 proceeds to estimate the sources of human speech sound based on audio cues. The audio based sound source estimator 710 receives, at 732, audio data acquired from the dialogue scene. Based on the audio data, it detects, at 742, acoustic signatures that correspond to human speech based on the speech sound models 715. In some embodiments, speech sound models 715 selected for the detection may be selected based on certain language, determined based on multi-model based ASR, discussed below. In some embodiments, a dialogue scene may deploy multiple acoustic sensors and each of the acoustic sensors may be associated with various parameters such as spatial locations with respect to the dialogue scene. The audio data collected for analysis may be associated with each of such distributed acoustic sensors. When human speech activities are detected from audio signal from a specific acoustic sensor, the source of the human speech sound so detected may then be related to the location of the specific acoustic sensor. Although a sensor deployed at a certain location may also receive speech signals occurred closer to other sensors, conventional technologies may be used to filter out such non-dominant sounds. Other approaches may also be used to ascertain the source (or direction or location) of detected human speech activities. Based on such detected speech activities and parameters associated with such activities (e.g., sensor location, the strength of the sound, etc.), the audio based sound source estimator 710 generates, at 752, audio based sound source candidates.

In some embodiments, the audio based estimation may also rely on additional cues relevant to, e.g., the on-going dialogue. For instance, if a speech profile (e.g., characteristic pitch of the voice of the user) of a user (user information as shown in FIG. 7) engaged in the current dialogue is available, such information may be utilized by the audio based sound source estimator to detect the characteristics of the sounds from different acoustic sensors to detect the direction or location of the user's sound. This may be particularly useful in tracking the user's location when the user is moving around during the dialogue. In some situations, if what needs to be tracked is the location of the user engaged in the current dialogue, the additional cues related to the user's voice parameters may also be used to filter out other possible sound sources, e.g., the sources where the sounds do not have the characteristics of the user. In some embodiments, in estimating sound source based on audio cues, to enhance estimation quality, the audio based sound source estimator 710 may utilize visual cues such as the estimated sound source candidates from the visual based sound source estimator 720. This is shown in FIG. 7, where the audio based sound source estimator 710 takes visual based sound source estimate(s) from 720. In some embodiments, each sound source candidate determined based on audio cues may be associated with a confidence score and if a similar sound source is also estimated based on visual cues, this may be used to improve the confidence score of the estimate from the audio cues.

The estimated sound source candidate(s) from both the audio based sound source estimator 710 and the visual based sound source estimator 720 are sent to the sound source disambiguation unit 730, where the estimated information is integrated to perform disambiguation, at 762, based on, e.g., disambiguation models 735 in order to generate, at 772, the final estimated sound source(s). In some embodiments, the integration of estimates or disambiguation may be performed based on additional information, e.g., what is specified in the disambiguation models 735. For example, the disambiguation models 735 may require that a sound source is affirmed only when the confidence scores of both candidates estimated based on audio and visual information meet a certain criterion, e.g., at least one of the confidence scores exceeds a certain level or the average confidence score is above a certain level. Another exemplary criterion may be that the locations of an audio and a visual based estimate are not far apart or adequately proximate to each other.

In some embodiments, the disambiguation may also be based on other information to select sound source(s), such as information about the user engaged in the current dialogue. The estimated sources/locations of sound (either acoustically detected or via lip movement) may need to be consistent with or affirmed based on the location of the user tracked in the dialogue scene. In this case, the user information (which may include the tracked location of the user) may be taken as input to the sound source disambiguation unit 730 and be used to affirm or disaffirm the estimated sources of sound.

Figure 8A:
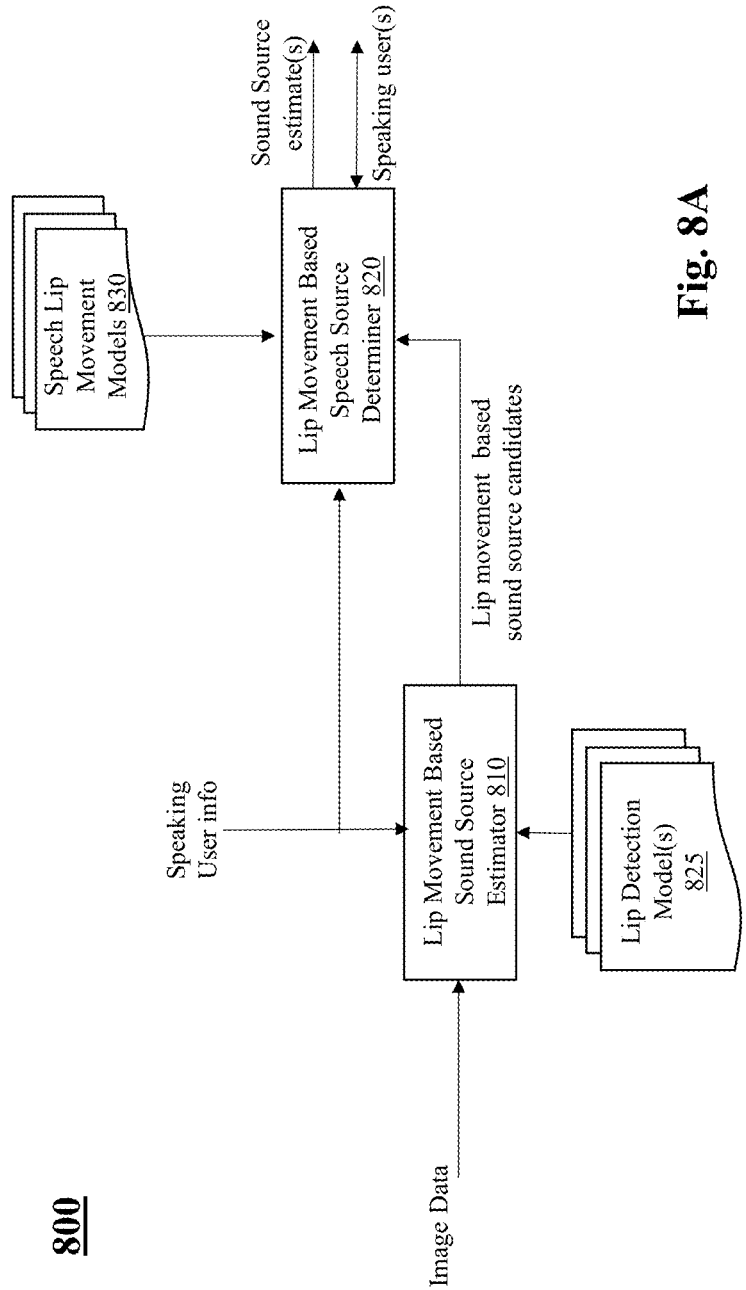
FIG. 8A depicts a different exemplary scheme of estimating a source of sound, according to some embodiments of the present teaching.

In some situations, such as noise environment, detecting a source of sound, especially speech sound, based on audio signals may pose some challenges and requiring detections of sound sources based on both audio based and visual based estimation may make it more difficult to achieve the goal. In this situation, the estimation may be performed in separate domains. FIG. 8A depicts a different exemplary scheme 800 for estimating a source of sound based on lip movement, according to some embodiments of the present teaching. In this illustrated embodiment, estimating a source of sound is performed based on detected lip movement that may represent speech activities. The scheme 800 comprises a lip movement based sound source estimator 810 and a lip movement based sound source determiner 820. The lip movement based sound source estimator 810 may be similarly constructed as that of the visual based sound source estimator 720 except that it may not receive audio based sound source candidates in its estimation of sound sources. The lip movement based sound source determiner 820 may receive the sound source candidates identified according to directions of detected lip movements based on lip detection models 825 and determine which one(s) includes speech activities. Such a determination may rely on speech lip movement models 830. In some situations, an estimated sound source may correspond to speech or non-speech related activities. From the perspective of an automated dialogue companion, sound from non-speech activities may not be as relevant. In this case, via the speech lip movement models 830, estimated source(s) of sound corresponding to non-speech activities may be filtered out.

Figure 8B:
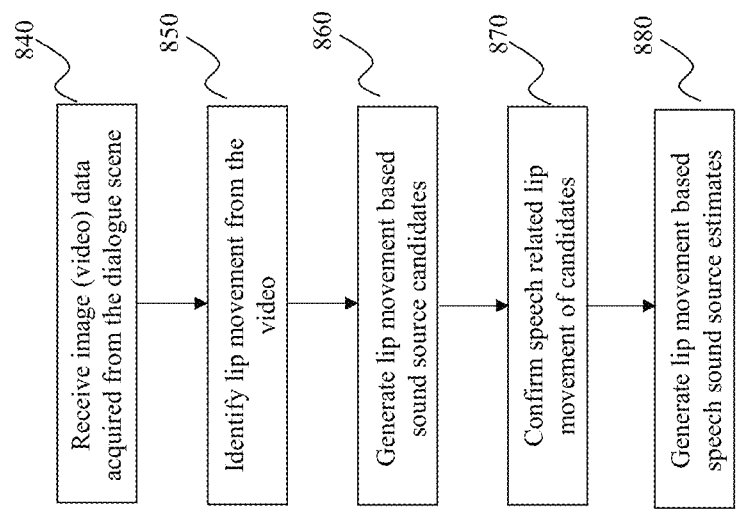
FIG. 8B is a flowchart of an exemplary process for estimating a source of sound, according to some embodiments of the present teaching.

FIG. 8B is a flowchart of an exemplary process for estimating a source of sound based on lip movement, according to some embodiments of the present teaching. When the lip movement based sound source estimator 810 receives, at 840, image data acquired from a dialogue scene, it identifies, at 850, lip movement from the received image data and generates, at 860, lip movement based sound source candidates. Such estimated candidates are then sent to the lip movement based speech source determiner 820, which then proceeds to affirm or disaffirm, at 870, whether each of the candidates corresponds to a speech sound related sound source based on speech lip movement models 830. In some embodiments, for any estimated candidate that is likely related to speech activities, the candidate may be output as a sound source estimate. For any estimated candidate that is unlikely related to speech activities, the candidate may be excluded from the sound source estimates output from the lip movement based speech source determiner 820. In some embodiments, instead of removing an estimated candidate corresponding to non-speech activities, the lip movement speech source determiner 820 may output it but with, e.g., confidence scores or other parameters characterizing it as an unlikely candidate for further speech recognition. Via such processing, the lip movement based speech source determiner then generates, at 880, lip movement based speech sound source estimates.

In some embodiments, the estimates of sound sources may also be performed via audio based estimation without being integrated with visual based result. In some embodiments, whether to use the estimates from a single modality (audio or visual without both considered) or integrating estimates from multiple modalities (consider results from both audio and visual estimators) may be determine dynamically based on, e.g., specific situations at the time. For example, if the dialogue scene is dark and visual based solution may become less reliable, audio based solution may be used to estimating the sources of sound. If the dialogue environment is crowded and hence noisy, the quality of audio based estimation may be unreliable, in this case, visual based solution may be used alone to derive estimates. If reasonable quality may be achieved in either modality, an integration mode to integrate the audio based estimates and the visual based estimates may be adopted to enhance the quality of the estimates.

Figure 9:
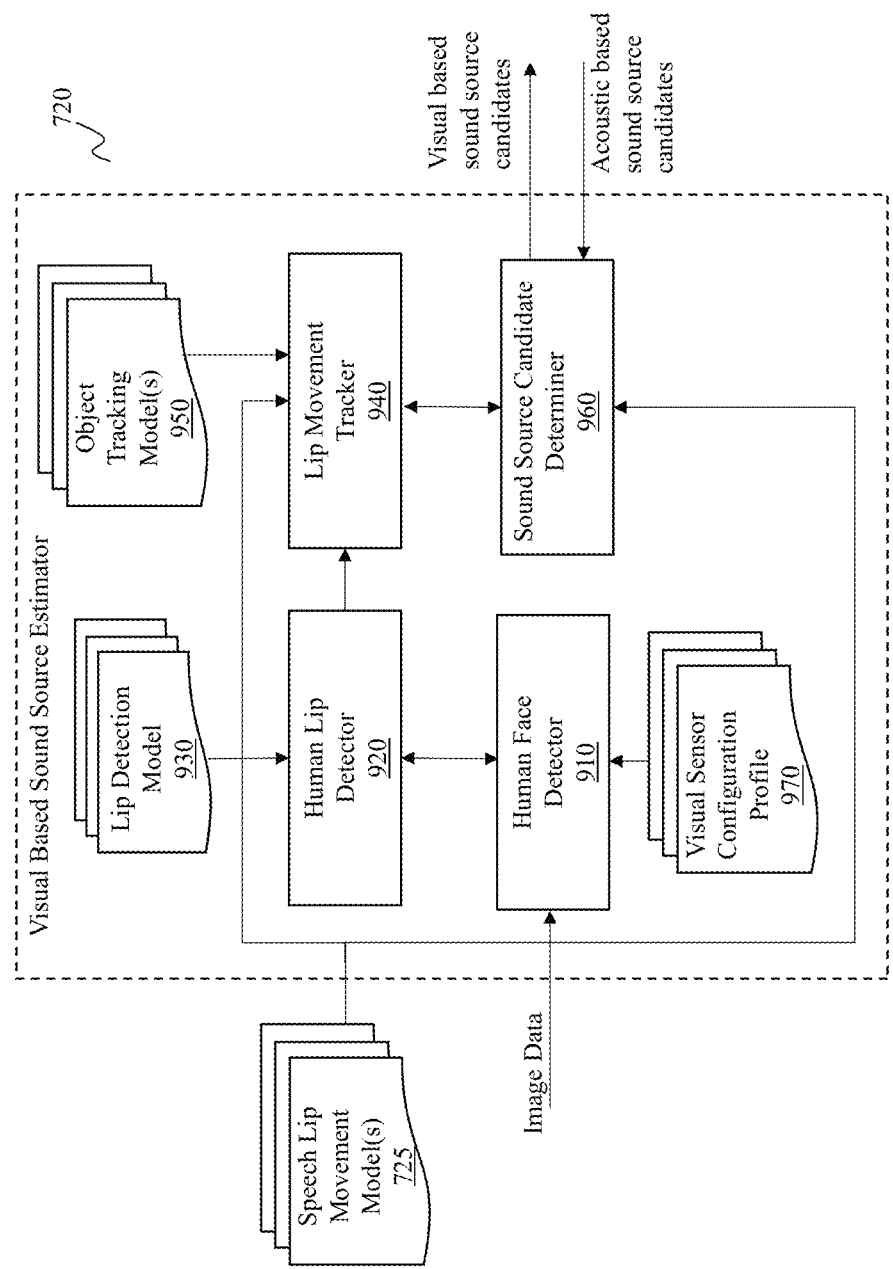
FIG. 9 depicts an exemplary high level system diagram of a visual based sound source estimator, according to some embodiments of the present teaching.

FIG. 9 depicts an exemplary high level system diagram of the visual based sound source estimator 720, according to some embodiments of the present teaching. As discussed herein, the exemplary construct of the visual based sound source estimator 720 may also be used for the lip movement based sound source estimator 810 except the aspect of considering the acoustic based sound source candidates in determining visual based (or lip movement based) sound source candidates.

Figure 10:
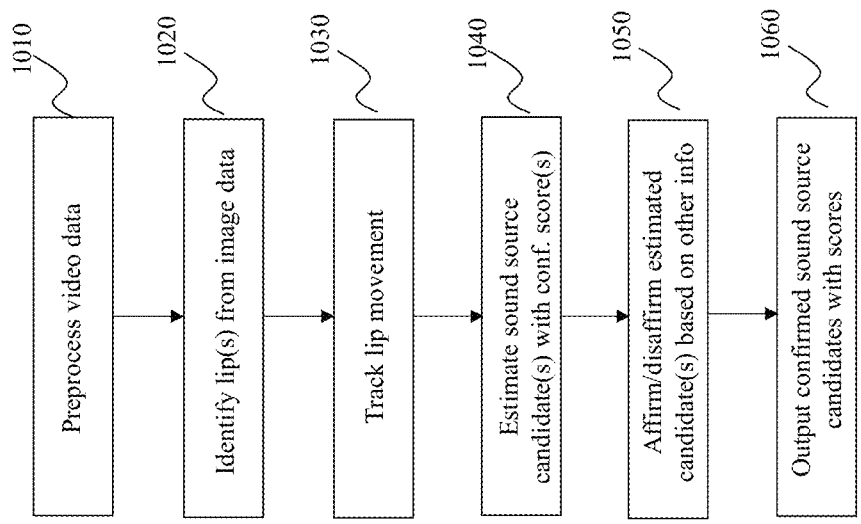
FIG. 10 is a flowchart of an exemplary process of a visual based sound source estimator, according to some embodiments of the present teaching.

In this exemplary embodiment, the visual based sound source estimator 720 may be illustrated with only components associated with estimating sound sources and it may include additional components for other computational needs associated with the automated dialogue companion. In this embodiment, the visual based sound source estimator 720 comprises a human face detector 910, a human lip detector 920, a lip movement tracker 940, and a sound source candidate determiner 960. FIG. 10 is a flowchart of an exemplary process of the visual based sound source estimator 720, according to some embodiments of the present teaching. In operation, the image data capturing visual information in a dialogue scene is first received at 1010 by the visual based sound source estimator 720. There may be one or more visual sensors deployed in the dialogue scene, specified by, e.g., a visual sensor configuration 970. Upon receiving the image data acquired by visual sensors configured in accordance with the visual sensor configuration profile 970, the human face detector 910 processes, at 1010 of FIG. 10, the input image data to detect faces of people who are present in the dialogue scene. The detected faces provide the basis for the human lip detector 920 to further detect lips on such faces. The detection of the lips may be based on a lip detection model 930.

In order to detect speech activities based on lip movement, the identified lip(s) may then be tracked, at 1030 by the lip movement tracker 940, across different frames in a video in the image data. Object tracking models 950 may be used to guide the lip movement tracker 940 to track lip movement and such tracking models may be specifically directed to different types of lip movement related to speech. In some embodiments, the speech lip movement models 725 may be used to identify certain lip tracking models which may be specifically directed to the language that is detected from the dialogue or known to be spoken by a user who is currently engaged in the dialogue. In some embodiments, the lip tracking may be conducted generally without specifics related to a particular language. In this case, so long as lip movement is detected over a specified period of time (e.g., more than 2 seconds) with changes in the track shape of a lip, it may be considered that speech activity exists.

The tracked lip movement information from the lip movement tracker 940 may be sent to the sound source candidate determiner 960, that may then estimate, at 1040, visual based sound source candidates and deriving a confidence score for each estimated sound source candidate. To achieve that, the sound source candidate determiner 960 may rely on information from different sources, including information related to the detected lip movement, the sound source candidates from the audio based sound source estimator 710 (may be provided on an on-going basis because both are estimating at the same time), and/or information from the speech lip movement models 725. In some embodiments, the sound source candidate determiner 960 may generally determine that any source where lip movement is detected corresponds to a sound source. In some embodiments, the sound source candidates may be detected in a more restrictive manner, e.g., limited to speech sound. In this case, a source of a detected sound may not be considered as a source of speech if the detected sound is unlikely corresponding to speech. For instance, a person in a dialogue scene may have just coughed, which led to lip movement yet without speech, and thus as the lip movement associated therewith may not correspond to speech activity, such lip movement may be excluded from being considered as a candidate source of speech sound.

Such a decision may be made based on, e.g., speech lip movement models 725. In some situations, operation to filter certain sounds based on likelihood of speech activities may be performed based on, e.g., some specifically selected speech lip movement models in 725, such as lip movement models directed to a specific language. For example, if a user engaged in a current dialogue speaks English, the automated dialogue companion may accordingly use lip movement models related to English to filter out sounds that do not correspond to English speaking activities. With such a filtering, only the locations where the lip movement detected correspond to the currently engaged language English may be considered as a sound source candidate. In some embodiments, the sound source candidate determiner 960 may also rely on additional information to enhance its estimation or use such information to affirm or disaffirm, 1050, its estimated sound sources. Such additional information may include the estimated sound source candidate(s) from the audio based sound source estimator 710, as discussed herein. The confidence score of each affirmed sound source may be updated as well. The affirmed sound source candidates and their updated confidence scores are then output at 1060.

Figure 11:
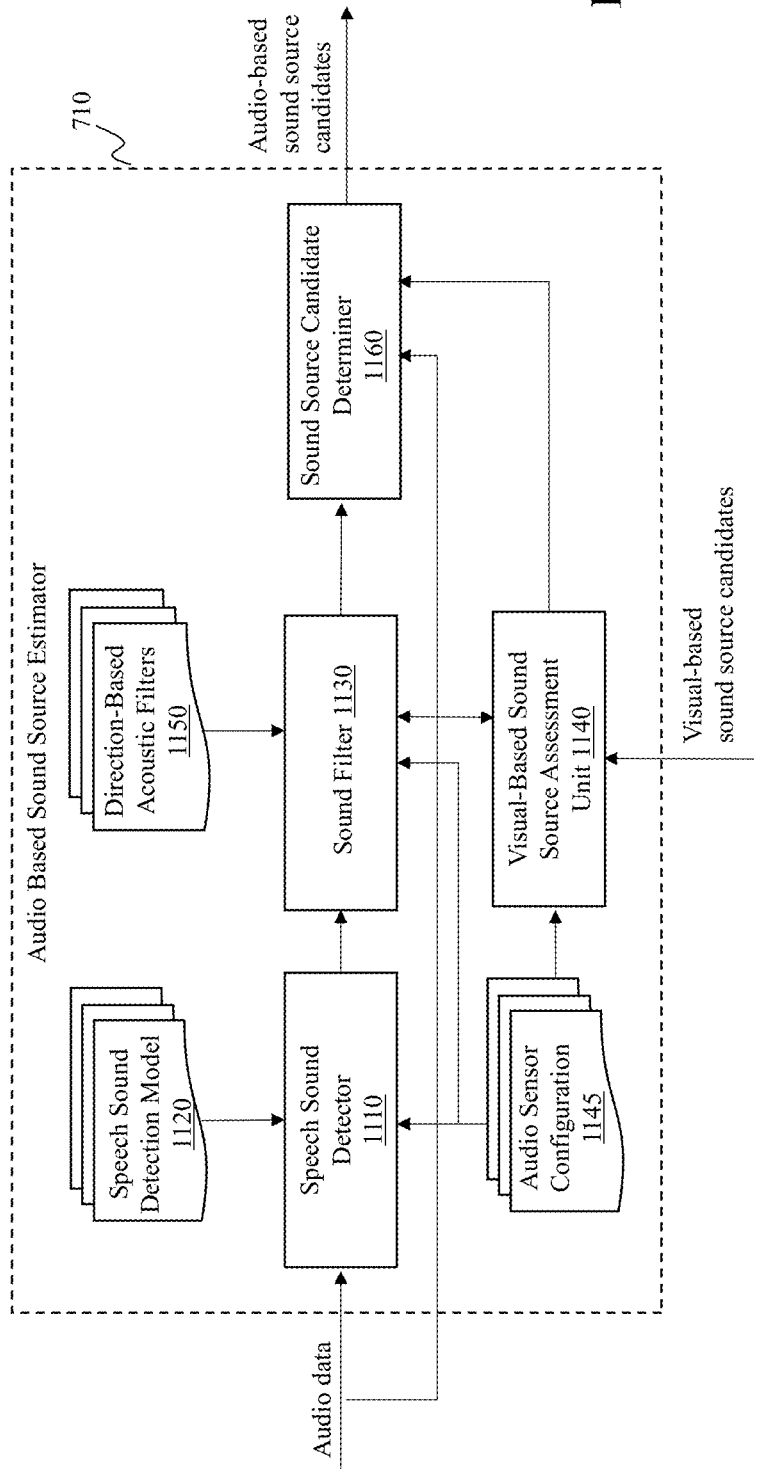
FIG. 11 depicts an exemplary high level system diagram of an audio based sound source estimator, according to some embodiments of the present teaching.

FIG. 11 depicts an exemplary high level system diagram of the acoustic based sound source estimator 710, according to some embodiments of the present teaching. The construct of this exemplary audio based sound source estimator 710 includes various exemplary components associated with estimating sound sources. This is for illustrating the concept of the present teaching and does not serve as a limitation. Other and additional components may be included to serve the same purpose of detecting sound sources based on acoustic signals. In this illustrated embodiment, the audio based sound source estimator 710 comprises a speech sound detector 1110, a sound filter 1130, a visual based sound source assessment unit 1140, and a sound source candidate determiner 1160. The speech sound detector 1110 is provided to detect, from the input audio data, sounds that likely correspond to human speech activities based on, e.g., models 1120 that characterize human speech sound. In some embodiments, depending on application needs, it is possible to also detect other types of sounds such as environmental sounds (beach, street, sports center, etc.), special event sounds (explosion, fire alarm, alerts, etc.). In this case, the 1120 may also include models that can be used to detect different types of sound in the dialogue scene.

The detected speech sound may also be filtered to either enhance sounds from certain locations or remove any undesired sounds. For instance, if the sound detected is likely from a user engaged in the dialogue in some direction in the dialogue scene, the speech sound from that direction may be filtered to enhance the signal quality. In addition, if a sound detected is not in a desirable direction, the sound from that direction may also be filtered out. Furthermore, certain sounds may not be desirable, e.g., speech sound that is too faint to be useful (e.g., speech sound with very low volume and likely from the environment), such sound may also be filtered out. The filtering may be directional to remove speech sound from locations that are not the focal point of the dialogue (e.g., speech from a corner of a room far apart from the user engaged in the dialogue). The appropriate filters in each of such directions may be used to either enhance the detected audio signal or to suppress the audio signal from the direction involved. Based on the filtered result, the sound sources may then be determined based on the filtered sounds.

Figure 12:
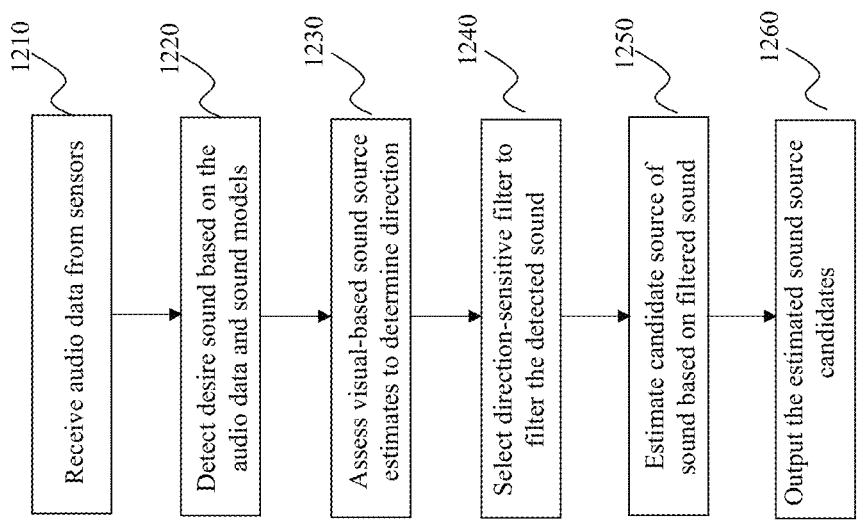
FIG. 12 is a flowchart of an exemplary process of an audio based sound source estimator, according to some embodiments of the present teaching.

FIG. 12 is a flowchart of an exemplary process of the audio based sound source estimator 720, according to some embodiments of the present teaching. In operation, the audio data may first be received, at 1210, by the speech sound detector 1110 from one or more acoustic sensors. The speech sound detector 1110 then detects, at 1220, a speech sound (or other sounds) based on, e.g., appropriately selected speech sound detection models 1120. To determine how the detected sounds may be filtered, the visual based sound source assessment unit 1140 may receive visual based sound source candidate(s) estimated by the visual based sound source estimator 720 and use such information to assess, at 1230, which sound from which directions may be of relevance. Such assessment may be used by the sound filter 1130 to invoke certain direction based acoustic filter(s) from the direction-based acoustic filters 1150 to filter, at 1240, the detected sounds. The selection of directions for filtering may also consider the configuration of acoustic sensors deployed in the dialogue environment. For instance, if a user engaged in the dialogue is known to be in a location of the dialogue scene where a particular acoustic sensor is deployed, a directional filter related to the particular acoustic sensor may be used to enhance the audio signal from that direction. After applying the selected filters, the filtered sounds may either be enhanced (if from a desirable direction) or eliminated or reduced. Based on the filtered sound signals, the sound source candidate determiner 1160 determines, at 1250, one or more sound source candidates and output such estimated sound source candidates at 1260.

Figure 13:
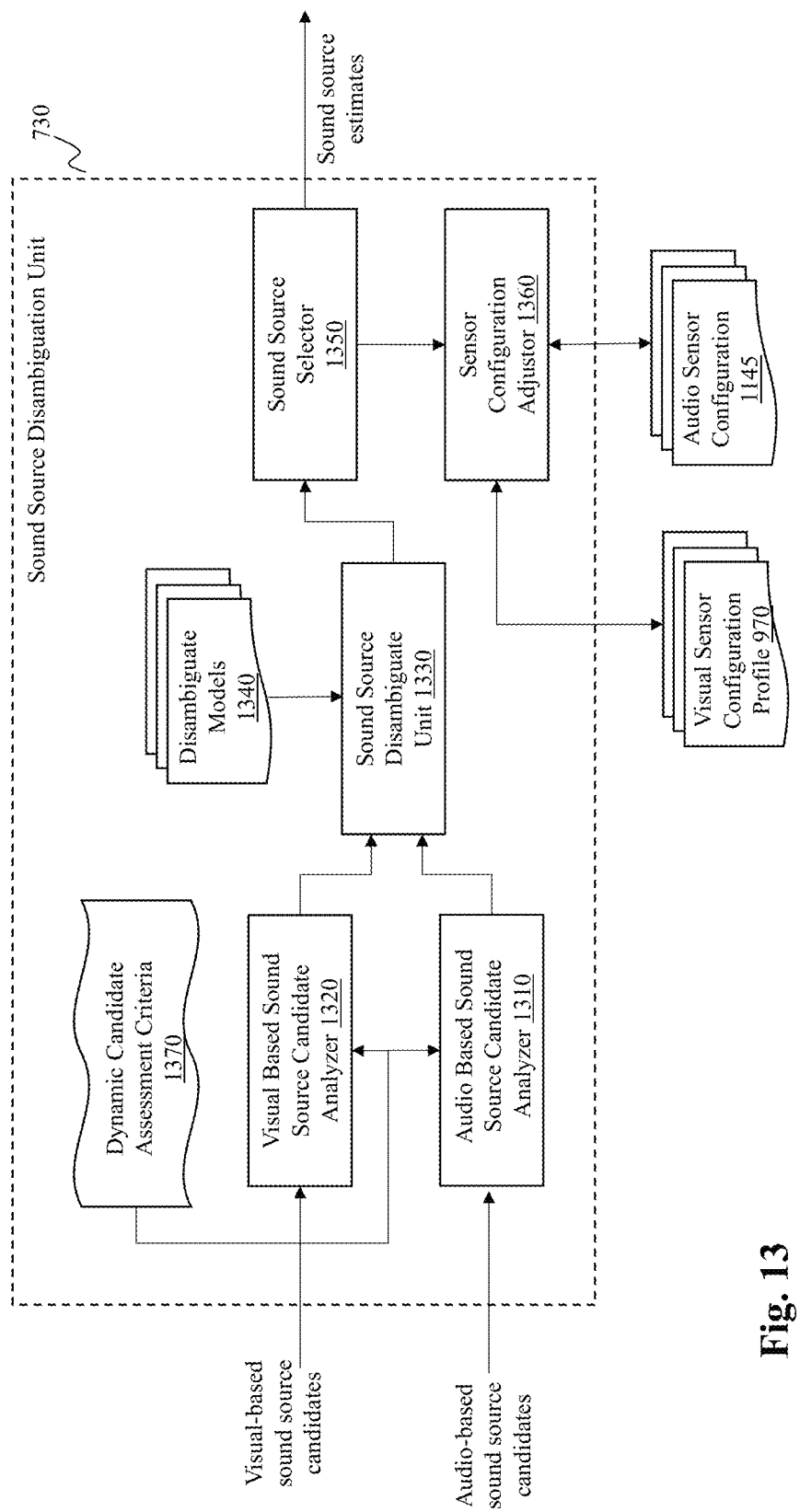
FIG. 13 depicts an exemplary high level system diagram of a sound source disambiguation unit, according to some embodiments of the present teaching.
Figure 14:
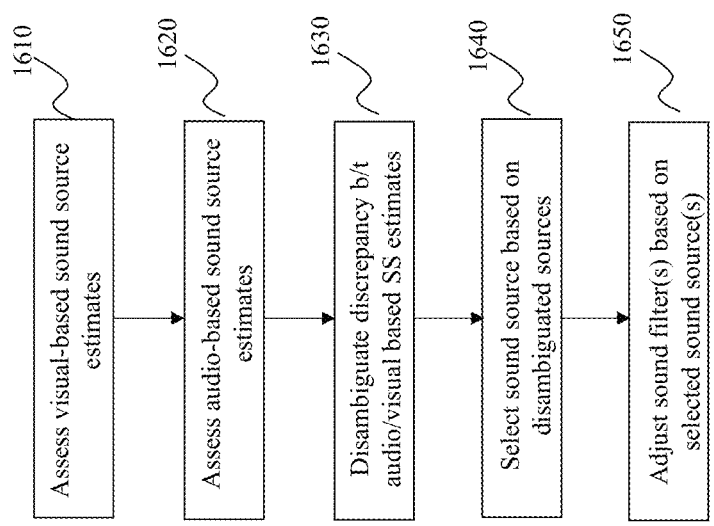
FIG. 14 is a flowchart of an exemplary process of a sound source disambiguation unit, according to some embodiments of the present teaching.

FIG. 13 depicts an exemplary high level system diagram of the sound source disambiguation unit 730, according to some embodiments of the present teaching. In this illustrated embodiment, the sound source disambiguation unit 730 comprises an audio based sound source candidate analyzer 1310, a visual-based sound source candidate analyzer 1320, a sound source disambiguate unit 1330, a sound source selector 1350, and optionally a sensor configuration adjuster 1360. FIG. 14 is a flowchart of an exemplary process of the sound source disambiguation unit 730, according to some embodiments of the present teaching. In operation, the visual-based sound source candidate analyzer 1320 takes the visual based sound source candidates from the visual based sound source estimator 720 and analyzes them at 1410. The analysis may be performed based on some criterion. For example, the sound source disambiguation unit 730 may require that the confidence score of each detected sound source be at a certain level. Similarly, the audio-based sound source candidate analyzer 1310 takes the audio based sound source candidates as input and performs, at 1420, an assessment based on some assessment criteria 1370. The criteria 1370 used by the analyzers 1310 and 1320 may be adaptively adjusted based on various considerations, depending on application needs or the dynamic situation in the current dialogue. For instance, if there are many source candidates identified, the required confidence level may be raised.

The visual and audio based sound source candidate that are passed the assessment may then be forward to the sound source disambiguate unit 1330 so that disambiguation can be performed based on sound sources estimated using cues in different modalities. The disambiguation may be performed, at 1430, based on, e.g., disambiguation models 1340, which may be learned via training based on training data previously collected. For example, models may dictate that to affirm a sound source, various conditions have to be met, e.g., the source may be detected in both audio and visual in close proximity, at least one of the sources has either a high confidence score or is consistent with a previously tracked source within a certain time period, a source that is consistent with a tracked target such as a user engaged in the dialogue, etc.

Such an ambiguation result may correspond to a ranked list of sound sources ordered based on, e.g., the level of confidence or consistency between the visual and audio based sound source candidates. The ranked list of sound sources may then be forward to the sound source selector 1350 and used to select, at 1440, a pre-determined number of sound sources based on, e.g., application needs and/or the ranks of the estimated sound sources. In some embodiments, information related to the selected sound sources may be optionally used to adjust, by the sensor configuration adjuster 1360 at 1450, the configuration of certain sensors, including some acoustic sensors specified in the audio sensor configuration 1145 or some visual sensors specified in the visual sensor configuration profile 970, so that such sensors may be better aligned with the sources of sound to facilitate continuous tracking of relevant information. For example, if a source of sound estimated via acoustic means and a source of sound estimated via lip movement tracking means have a small overlap area, e.g., the visual scene contains only a small part of a user engaged in the dialogue, the camera which captures only the small part of the user may be adjusted to cover the field of view more aligned with the source direction estimated from the audio signal (e.g., by changing installation parameters of the camera such as turning, tilting, etc.) to get a better visual coverage of the user in future video capture. As another example, an audio sensor may also be adjusted in terms of either its installation parameters (e.g., directionality used to collect sound signal) or functional parameters (e.g., increase the noise cancellation performed by the sensor).

The estimated sources of sound, especially sources of speech sound, may be used by an automated dialogue companion to better direct its focus to certain relevant speeches, e.g., the speech from a user engaged in the current dialogue. As discussed herein, with estimated sources of speech sound, sensor configuration (which may include both installation parameters or functional parameters, may be adjusted to collect data from a more precise location or apply more relevant signal pre-processing to the collected data) may be modified to enhance data collection from selected location to produce sensor data with improved quality. Such improved sensing and sensing signals may further enable enhances speech recognition which is a crucially important aspect in user machine dialogues.

The present teaching discloses an integrated approach to speech recognition by combining acoustic and visual cues. Specifically, the present teaching combines speech recognition based on acoustic speech recognition and visual cue based speech recognition via lip reading to more reliably generate text representing the recognized speech of an utterance of a user engaged in a dialogue. Such text is typically generated by a speech to text component in an automated dialogue companion and the text from a speech from a user may then be used by the dialogue manager 510 to determine a response in carrying out a conversation with a user.

Figure 15:
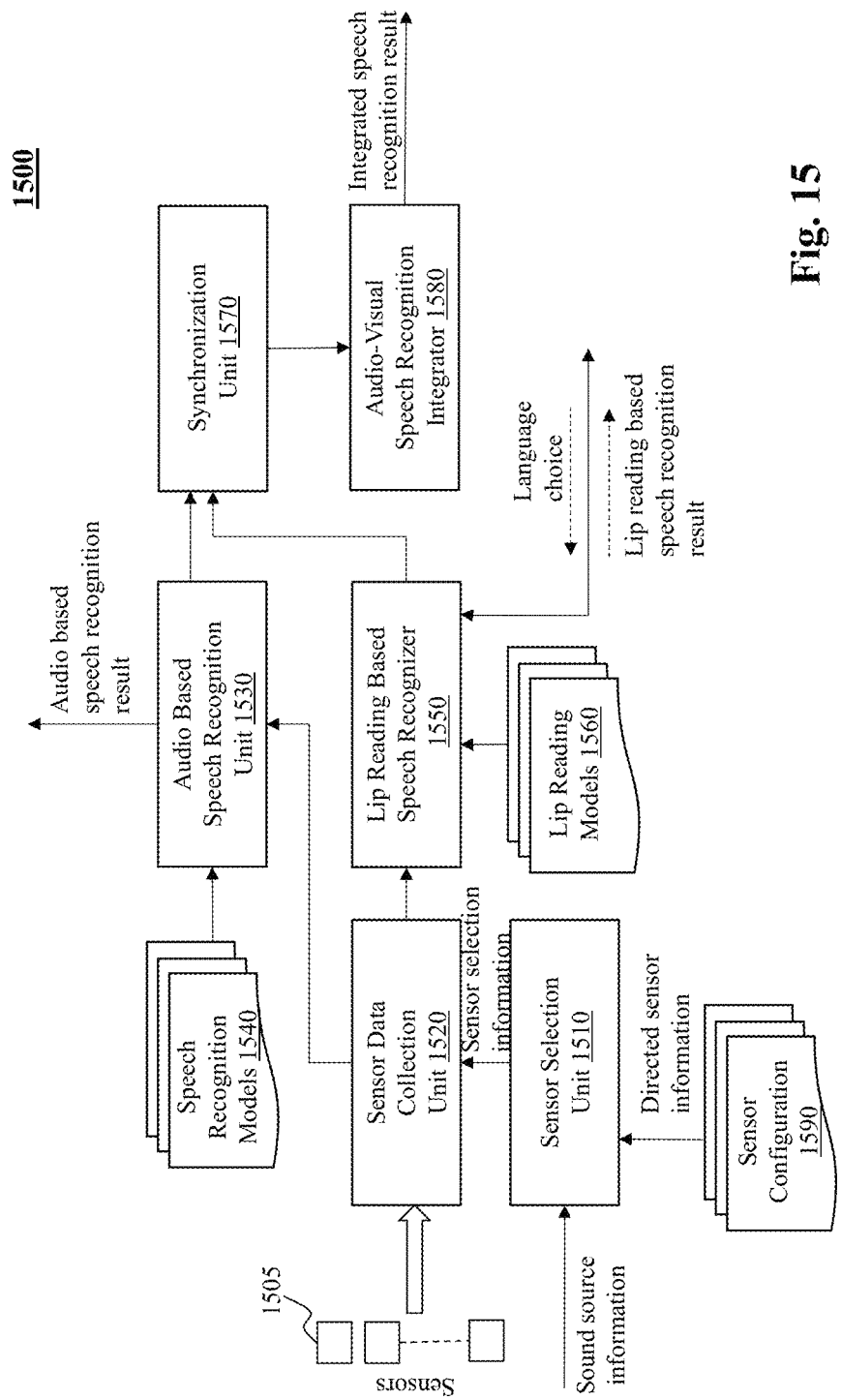
FIG. 15 depicts an exemplary high level system diagram of an integrated speech recognition mechanism, according to some embodiments of the present teaching.

FIG. 15 depicts an exemplary high level system diagram of a speech to text (STT) mechanism 1500, according to some embodiments of the present teaching. Although the construct of this illustrated STT mechanism 1500 includes only components for recognizing speech based on integrated audio and visual cues, it may, in different embodiments, include additional components for other purposes. In this illustrated embodiment, the STT mechanism 1500 comprises an audio based speech recognition unit 1530, a lip reading based speech recognizer 1550, a synchronization unit 1570, and an audio-visual speech recognition integrator 1580. Optionally, the STT mechanism 1500 may also include a sensor selection unit 1510 and a sensor data collection unit 1520, which together may be utilized to collect audio/visual information from selected sensors, which may be determined based on, e.g., estimated sound sources.

Figure 16:
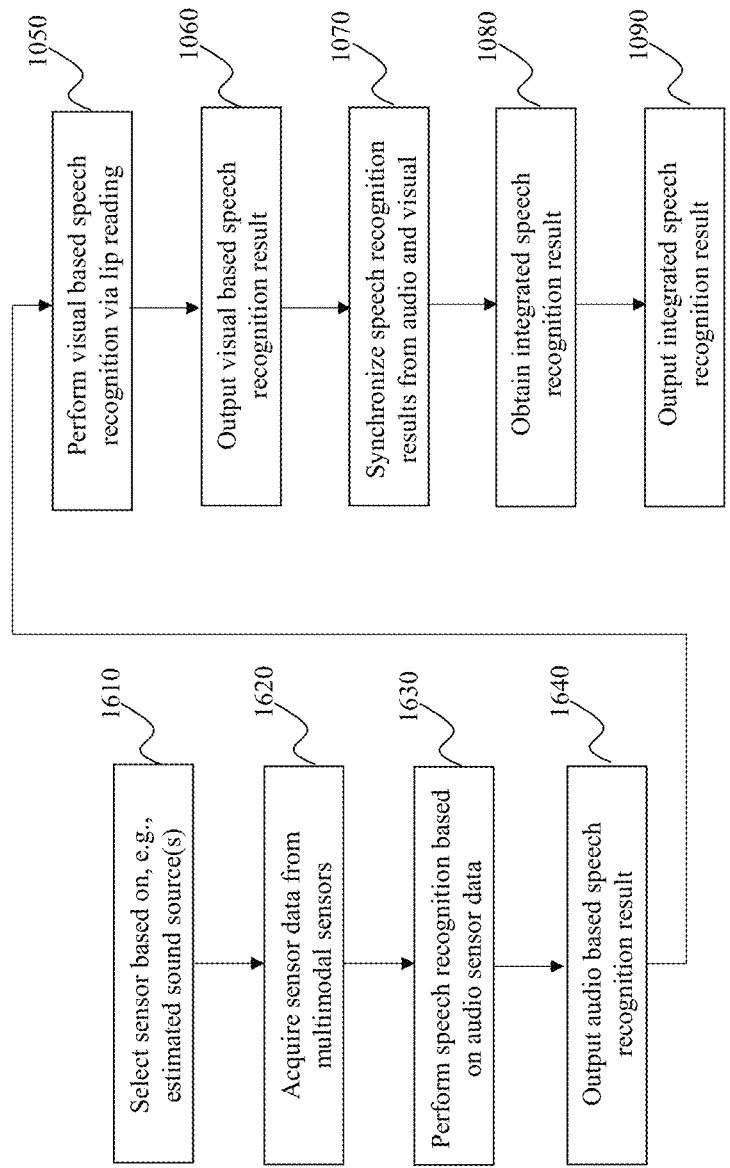
FIG. 16 is a flowchart of an exemplary process of an integrated speech recognition mechanism, according to an embodiment of the present teaching.

FIG. 16 is a flowchart of an exemplary process of the STT mechanism 1500, according to an embodiment of the present teaching. In operation, the audio based speech recognition unit 930 and the lip reading based speech recognizer 950 may respectively receive audio and visual signals as input and proceed with their respective speech recognition. In some embodiments, optionally as shown in FIG. 16, the sensor selection unit 1510 may first select, at 1610, sensors for collecting data based on, e.g., the estimated sources of speech sound and/or information stored in sensor configuration 1590 (which may correspond to a combination of the visual sensor configuration profile 970 and the audio sensor configuration 1145). In some embodiments, the sensor selection unit 1510 may also takes other type of instruction on sensor selection and accordingly select, based on an information stored in the sensor configuration 1590, some of the available sensors for speech related data acquisition. Based on the sensor selection information generated by the sensor selection unit 1510, the sensor data collection unit 1520 may connect to the selected sensors in a collection of sensors 1505 and acquire, at 1620, sensor data in acoustic and visual domains from the selected sensors.

Acoustic input data acquired by selected acoustic sensor(s) may then be sent to the audio based speech recognition unit 1530 for speech recognition based on audio data. Visual input data acquired by selected visual sensor may then be sent to the lip reading based speech recognition unit 1550 for speech recognition based on visual data. When the audio based speech recognition unit 1530 receives the audio signals from acoustic sensor(s), it performs, at 1630, speech recognition based on speech recognition models 1540 and then outputs, at 1640, the audio based speech recognition result, corresponding to a text string. Similarly, when the lip reading based speech recognizer 1550 receives the visual data (video), it performs, at 1650, speech recognition based on lip reading in accordance with lip reading models 1560. The lip reading based speech recognition result is then output, at 1660. Lip reading based speech recognition is language dependent, e.g., a lip reading model for English differs from a lip reading model for French. Thus, the lip reading based speech recognition unit 1550 performs speech recognition, at 1650, by comparing tracked lip movements (observed in the visual input data) against some lip reading model(s) appropriate for the underlying language for the speech recognition. The appropriate lip reading model may be selected (from the lip reading models 1560) based on, e.g., an input related to language choice. The lip reading based speech recognition result, corresponding to a text string, is then output at 1660. Before the audio based and lip reading based speech recognition results can be integrated, they are to be synchronized first. This is achieved by the synchronization unit 1570 at 1670. Then, based on the synchronized audio based and lip reading based speech recognition results, the audio-visual speech recognition integrator 1580 integrates the synchronized result and obtains, at 1680, the integrated speech recognition result and outputs, at 1690, the integrated result.

Figure 17:
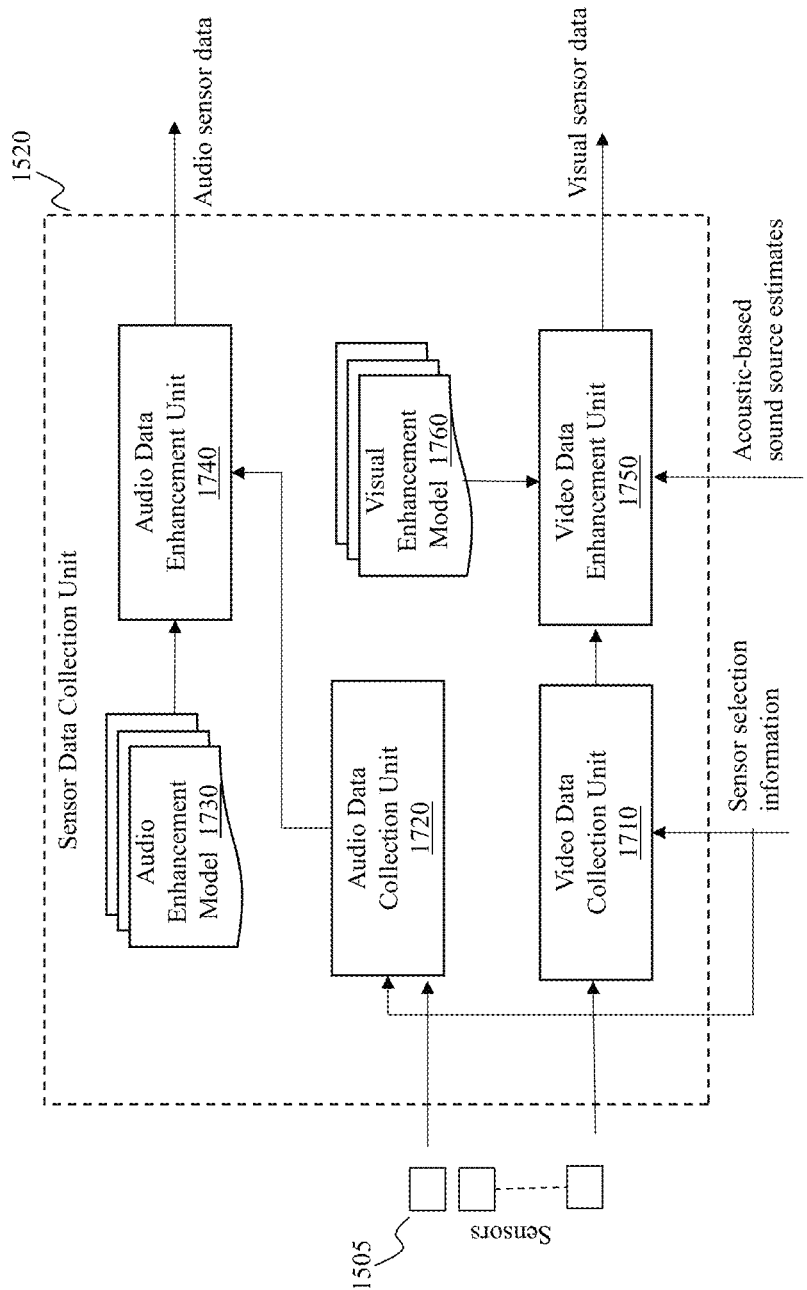
FIG. 17 depicts an exemplary high level system diagram of a sensor data collection unit, according to an embodiment of the present teaching.

FIG. 17 depicts an exemplary high level system diagram of the sensor data collection unit 1520, according to an embodiment of the present teaching. In this illustrated embodiment, the sensor data collection unit 1520 is to collect sensor data from multimodal sensors selected based on sensor selection information received from the sensor selection unit 1510. In this illustrated embodiment for integrated speech recognition, the sensor data to be collected include audio for audio based speech recognition and visual data for lip reading based speech recognition. The sensor data collection unit 1520 comprises a visual data collection unit 1710, an audio data collection unit 1720, and optionally a video data enhancement unit 1750 for enhancing the collected visual sensor data and an audio data enhancement unit 1740 for enhancing the collected audio sensor data before they are used for respective speech recognition. The video data enhancement unit 1750 may enhance the collected visual data such as video based on a visual enhancement model 1760. The audio data enhancement unit 1740 may enhance the collected audio data based on an audio enhancement model 1730. The enhanced audio and visual data are then output to the audio based speech recognition unit 1530 and the lip reading based speech recognition 1550, respectively, for speech recognition.

Figure 18:
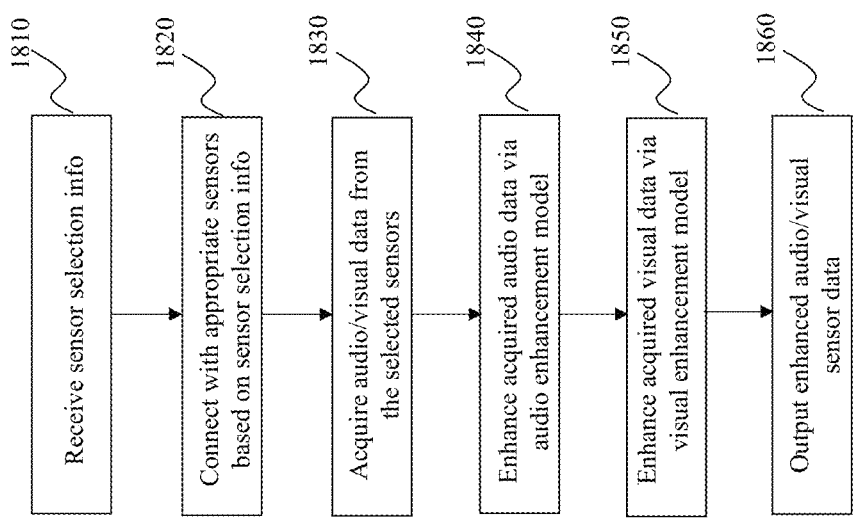
FIG. 18 is a flowchart of an exemplary process of a sensor data collection unit, according to an embodiment of the present teaching.

FIG. 18 is a flowchart of an exemplary process of the sensor data collection unit 1520, according to an embodiment of the present teaching. In this illustrated embodiment, the sensor data collection unit 1520 first receives, at 1810, sensor selection information from the sensor selection unit 1510. As discussed herein, in some embodiments, the sensor selection unit 1510 may generate the sensor selection information based on, e.g., the estimated source of speech sound (estimated based on disclosure associated with FIGS. 7-14). In other embodiments, the sensor selection unit 1510 may receive explicit instruction on what sensor to select specified in the sensor configuration 1590. Such explicit instruction may be provided by a user when configuring an automated dialogue companion or according to some control signal generated when, e.g., the automated dialogue companion is activated.

Upon receiving the sensor selection information, the sensor data collection unit 1520 selects, at 1820, sensors accordingly. Specifically, the audio data collection unit 1720 may proceed to select acoustic sensor(s) for audio data collection based on the sensor selection information and the video data collection unit 1710 may proceed to select visual sensors for visual data collection based on the sensor selection information. With the appropriate multimodal sensors selected, the audio data collection unit 1720 and the video data collection unit 1710 acquire, at 1830, individual streams of sensor data from their respective selected sensors. To enhance the acquired sensor data, the audio data collection unit 1720 sends the acquired audio data to the audio data enhancement unit 1740, which then enhances, at 1840, the acquired audio data based on the audio enhancement model 1730. Similarly, to enhance the acquired visual data, the video data collection unit 1710 sends the acquired visual data to the video data enhancement unit 1750, which then enhances, at 1850, the acquired video data based on the visual enhancement model 1760. The enhanced audio data are then output, at 1860, by the audio data enhancement unit 1740 to the audio based speech recognition unit 1530 for acoustic speech recognition processing. The enhanced video data are then output, at 1860, by the video data enhancement unit 1750 to the lip reading based speech recognition unit 1550 for acoustic speech recognition processing.

As discussed herein, although steps and description related to sensor selection are included in the illustrated embodiment, sensor selection is optional and the manner by which sensors may be selected as disclosed herein may also vary. In some embodiments, audio and visual sensors may have been previously selected or specified and thus no selection is needed. In other situations, the sensors may be fixed. Although sensors may be selected based on detected sources of speech sound and the configured locations of deployed sensors according to some aspects of the present teaching, the aspects of the present teaching related to integrated speech recognition (based on acoustic based speech recognition and lip reading based speech recognition) may be independent of the aspects of the present teaching related to estimating source of speech sound.

Figure 19:
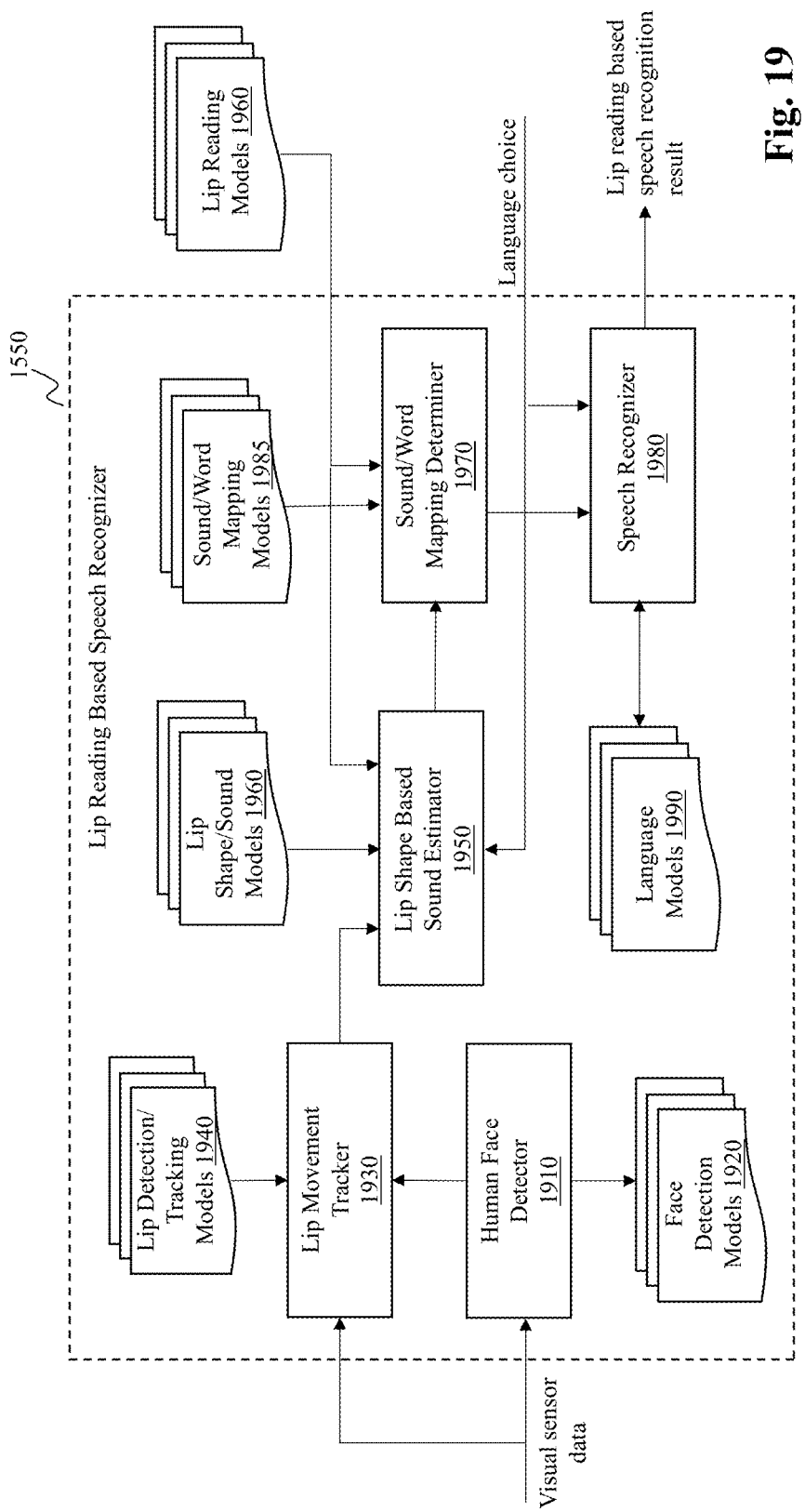
FIG. 19 depicts an exemplary system diagram of a lip reading based speech recognizer, according to an embodiment of the present teaching.

The acquired audio signals (whether enhanced or raw) may be used for speech recognition via acoustic means. The acquired visual information (e.g., video) may be used for speech recognition via lip reading by analyzing the visual information and recognizing what is being uttered based on lip movements of a speaker captured in the visual information. FIG. 19 depicts an exemplary system diagram of the lip reading based speech recognizer 1550, according to an embodiment of the present teaching. In this illustrated embodiment, the lip reading based speech recognizer 1550 comprises a human face detector 1910, a lip movement tracker 1330, a lip shape based sound estimator 1950, a sound/word mapping determiner 1970, and a speech recognizer 1980. To perform lip reading based speech recognition, lip detection and tracking in video data is performed by the human face detector 1910 based on face recognition models 1920 and by the lip movement tracker 1930 based on lip detection/tracking models 1940. The shape of the tracked lip and the dynamic lip movements are analyzed by the lip shape based sound estimator 1950 based on lip shape/sound models 1960 in order to map the observed shape of the lip to sound of a specific spoken language.

Mapping lip shape and/or lip movement to a sound may involve viseme analysis, where a viseme may correspond to a generic image that is used to describe a particular sound. As commonly known, a viseme may be a visual equivalent of a phoneme or acoustic speech sound in a spoken language and can be used by hearing-impaired person to view sounds visually. To derive a viseme, the analysis needed may depend on the underlying spoken language. In the present teaching, the lip shape/sound model(s) from 1960 may be used for determining sounds corresponding to lip shapes. In recognizing visemes associated with a spoken language, an appropriate lip shape/sound model may be selected according to a known current language. The selection may be based on, e.g., the language choice input received, which may be pre-determined in different situations. For example, an agent may be configured to speak a certain language, a language choice may be set at the beginning of a dialogue session, the language spoken may be dynamically estimated based on what a user said (which will be discussed in reference to FIG. 22). Based on the sounds mapped from the tracked lip shapes/movements, the sound/word mapping determiner 1970 obtains words based on sounds based on sound/word mapping models 1985 that are directed to a certain language choice. Then based on words obtained based on lip reading, the speech recognizer 1980 recognizes the speech based on certain language models 1920 relies on certain language model from 1990 selected based on the language choice.

Figure 20:
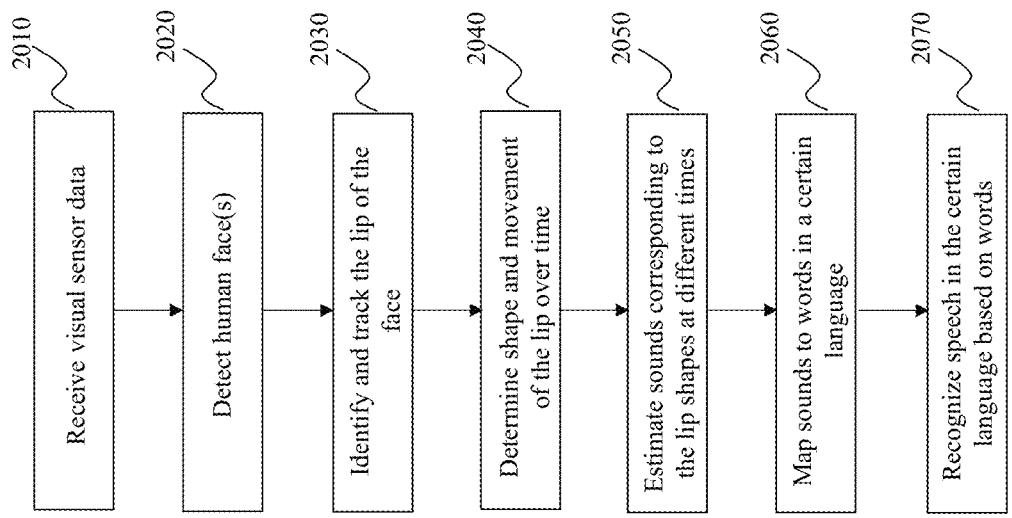
FIG. 20 is a flowchart of a lip reading based speech recognizer, according to an embodiment of the present teaching.

FIG. 20 is a flowchart of the lip reading based speech recognizer 1550, according to an embodiment of the present teaching. In operation, when visual sensor data are received, at 2010 of FIG. 20, visual sensor data, the human face detector 1910 detects, at 2020, a face of a person based on the face detection model 1920. From the detected human face, the lip movement tracker 1930 identifies and tracks, at 2030, the lip of the person based on lip detection/tracking models 1940. In some embodiments, when a visual sensor selected to collect the visual data is chosen based on a source of speech of a person (e.g., the user engaged in the current dialogue), the visual data capture the person and the lip movements of the person are used to perform lip reading of the person says.

The tracked lips may then be analyzed to ascertain, at 2040, the shapes of the lip at different times and the changes in shapes across different times. Based on such shapes and movements (that make the shape changes), the lip shape based sound estimator 1950 estimates, at 2050, the corresponding sounds the person makes based on the lip shape/sound models 1960. As illustrated in FIG. 19, the specific lip shape/sound models used to estimate the sound is language dependent and may be selected by the lip shape based sound estimator 1950 based on language choice input. The estimated sounds may then be sent to the sound/word mapping determiner 1970, that maps, at 2060, sounds estimated based on lip reading to words in a certain language based on some sound/word mapping models from 1985 selected based on, e.g., the language choice input. Once the words are estimated, they are sent to the speech recognizer 1980, which then recognizes, at 2070, the content of the speech by the user based on a language model for a specific language selected from 1990 based on the language choice input. Such obtained speech recognition result is derived from lip reading based on visual input data.

Referring back to FIG. 15, as discussed herein, once the speech recognition results are obtained from the audio based speech recognition unit 1530 and the lip reading based speech recognizer 1550, they are synchronized by the synchronization unit 1570. In some embodiments, the synchronization may be performed by aligning the speech recognition results from 1530 and 1550 in terms of timestamps. With aligned speech recognition results, the audio-visual speech recognition integrator 1580 integrates the audio and visual based speech recognition results to generate integrated speech recognition result. The integration may be performed in accordance with different embodiments. In some embodiments, the integration may occur after the speech recognition in each modality has been completed (as disclosed above). The integration may simply take the recognition result that has a higher confidence score. The integration may also be performed at a more detailed level such as at a word level. Each word recognized based on audio signal may be compared with a corresponding word (e.g., with the same timestamp) recognized based on lip reading and make a decision as to which version is to adopt. In making a decision which version of the recognized word to adopt may also be made based on the context, e.g., the word(s) occurred prior to or after the word that is assessed.

Figure 21:
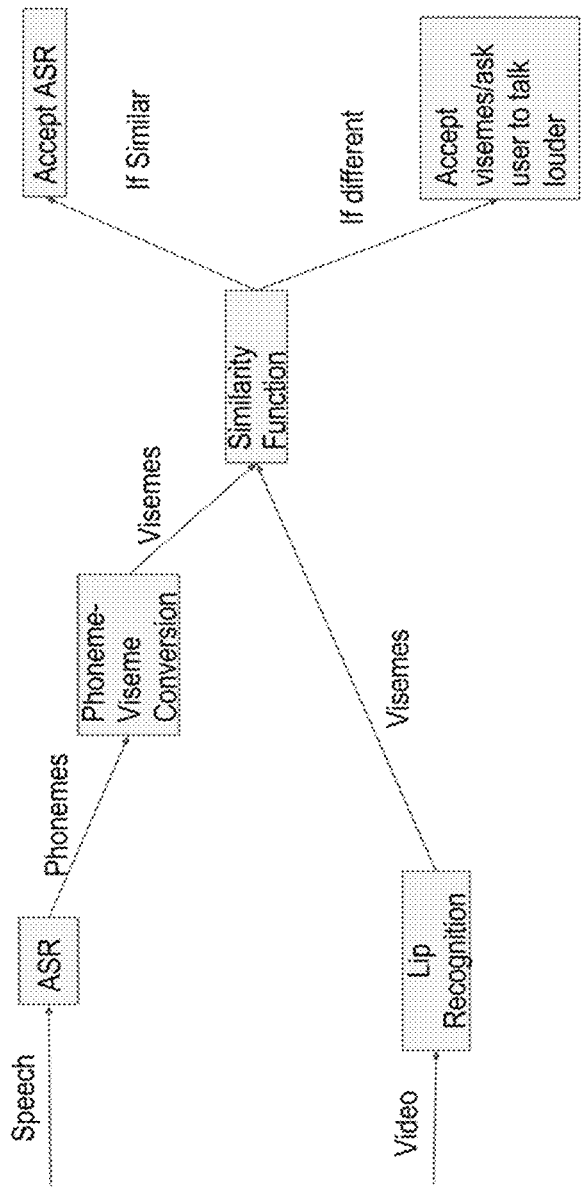
FIG. 21 illustrates an exemplary scheme of integrating audio based and lip reading based speech recognition results, according to an embodiment of the present teaching.

In some embodiments, the integration may also be performed at an even lower level. For instance, the integration may be performed based on phonemes estimated based on sound (audio based) or visemes recognized based on lip reading (visual based). FIG. 21 illustrates an exemplary scheme for integrating audio based speech recognition (ASR) and the lip reading based speech recognition, according to a different embodiment of the present teaching. As shown, speech signal is processed respectively via ASR and video data are processed via lip recognition. In some embodiments, the ASR generates phonemes and the lip reading generates visemes. To integrate the recognition results, comparison is performed between the recognition results. For example, the phonemes from the ASR are converted into visemes and similarity between the visemes converted from phonemes from the ASR and that from the lip reading are assessed. In some embodiments, if they are similar, e.g., the similarity exceeds a certain level, the recognition result from ASR is accepted because it is supported by the lip reading result. If the similarity level of the visemes from ASR and lip reading is below a set level, the visemes may be accepted but the recognition result may be associated with a low confidence score. In some embodiments, the automated dialogue companion or the agent may request the user engaged in the dialogue to speak louder so that the next round of recognition may be based on better signals. In some situations, if the similarity is low according to some criterion, the visemes may not be accepted and the automated dialogue companion may react to the situation by letting the user know that what is spoken cannot be discerned and ask the user to say it again.

As discussed herein, in speech recognition, either based on data in the audio domain or data in the visual domain, information about the spoken language at issue is relevant and is used to select appropriate models in assisting speech recognition in the corresponding domain. In user machine dialogues, sometimes the spoken language to be used in the dialogue may not be known prior to the conversation. Although in certain situations, the initial dialogue may be directed to a conversation for identifying a language to conduct a dialogue, it is sometimes not practical because a user may not be able to engage in such initial dialogue due to language barrier. Thus, it is important to devise means to detect a language a user is speaking and then adapt the automated dialogue companion accordingly to carry on a dialogue in the detected language. As illustrated in FIGS. 15 and 19, in performing speech recognition, a language choice input is received and used to select appropriate models to be used for speech recognition. This will facilitate user machine interactions, particularly in helping an agent to dynamically adapt to a language a user is speaking, and thus improve the communication with users.

Figure 22:
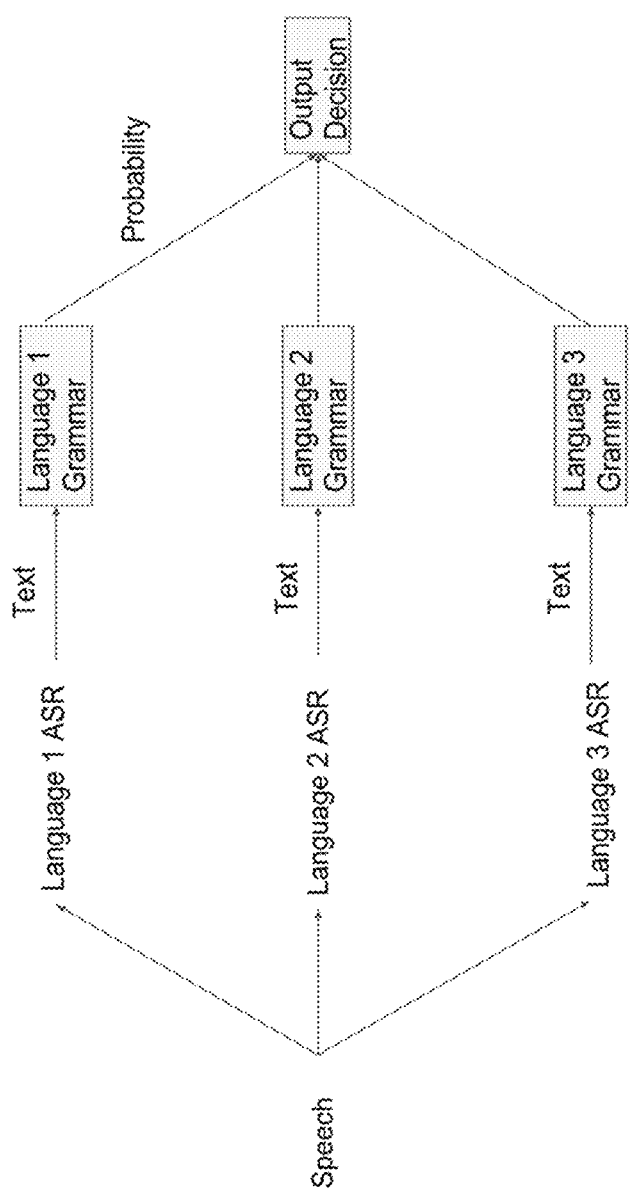
FIG. 22 depicts an exemplary scheme of detecting a spoken language based on multiple model based speech recognition, according to an embodiment of the present teaching.

FIG. 22 illustrates an exemplary scheme for detecting a spoken language via parallel speech recognition using multiple language models, according to some embodiments of the present teaching. In this exemplary scheme, when a speech signal is received, a plurality of automated speech recognition in different languages are activated to process the speech signal in parallel to recognize the words spoken represented by text in different languages. For example, the first ASR may be for English, the second ASR may be for Spanish, the third ASR may be for French, . . . , etc. The words or text produced by each of the ASRs may or may not be recognized correctly and the recognized results may be associated with estimated confidence. For example, a user may be speaking in French and the English ASR may still produce English words as recognized results but the recognition may be associated with low confidence scores for each of French words.

When a sequence of words in a certain language are recognized, the sequence may be further processed using a grammar model corresponding to the language. If it is the correct language, the sequence of words likely will fit some grammatical structure according to the grammar model of that language. If it is the incorrect language, in addition to low confidence scores on recognized words, the sequence of words likely will not fit any of the grammatical structure of that language. In some embodiments, a probability with respect to each language may be determined based on how far away a "recognized" sentence based on a speech model in that language is to a closest valid sentence in that language and such a probability indicates the likelihood that a speaker is speaking the language. In some embodiments, such a probability may also be determined by taking into account the values of the confidence scores associated with the words in the sequence of words. In this manner, with respect to each of the plurality of ASRs, there may be a probability indicative of the likelihood that the user is speaking in a language corresponding to the ASR. The higher the probability associated with a language is, the more likely that the user's spoken language is in that language.

Figure 23:
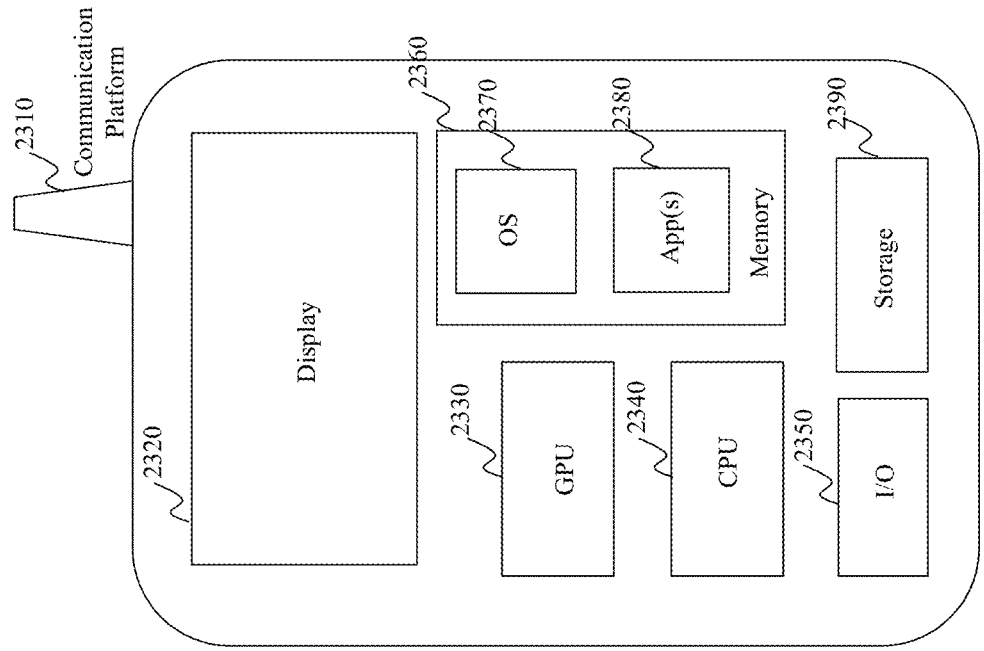
FIG. 23 is an illustrative diagram of an exemplary mobile device architecture that may be used to realize a specialized system implementing the present teaching in accordance with various embodiments.

FIG. 23 is an illustrative diagram of an exemplary mobile device architecture that may be used to realize a specialized system implementing the present teaching in accordance with various embodiments. In this example, the user device on which the present teaching is implemented corresponds to a mobile device 2300, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 2300 may include one or more central processing units ("CPUs") 2340, one or more graphic processing units ("GPUs") 2330, a display 2320, a memory 2360, a communication platform 2310, such as a wireless communication module, storage 2390, and one or more input/output (I/O) devices 2340. Any other suitable component, including but not limited to a system bus or a controller (not shown), may also be included in the mobile device 2300. As shown in FIG. 23 a mobile operating system 2370 (e.g., iOS, Android, Windows Phone, etc.), and one or more applications 2380 may be loaded into memory 2360 from storage 2390 in order to be executed by the CPU 2340. The applications 1480 may include a browser or any other suitable mobile apps for managing a conversation system on mobile device 2300. User interactions may be achieved via the I/O devices 2340 and provided to the automated dialogue companion via network(s) 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 24:
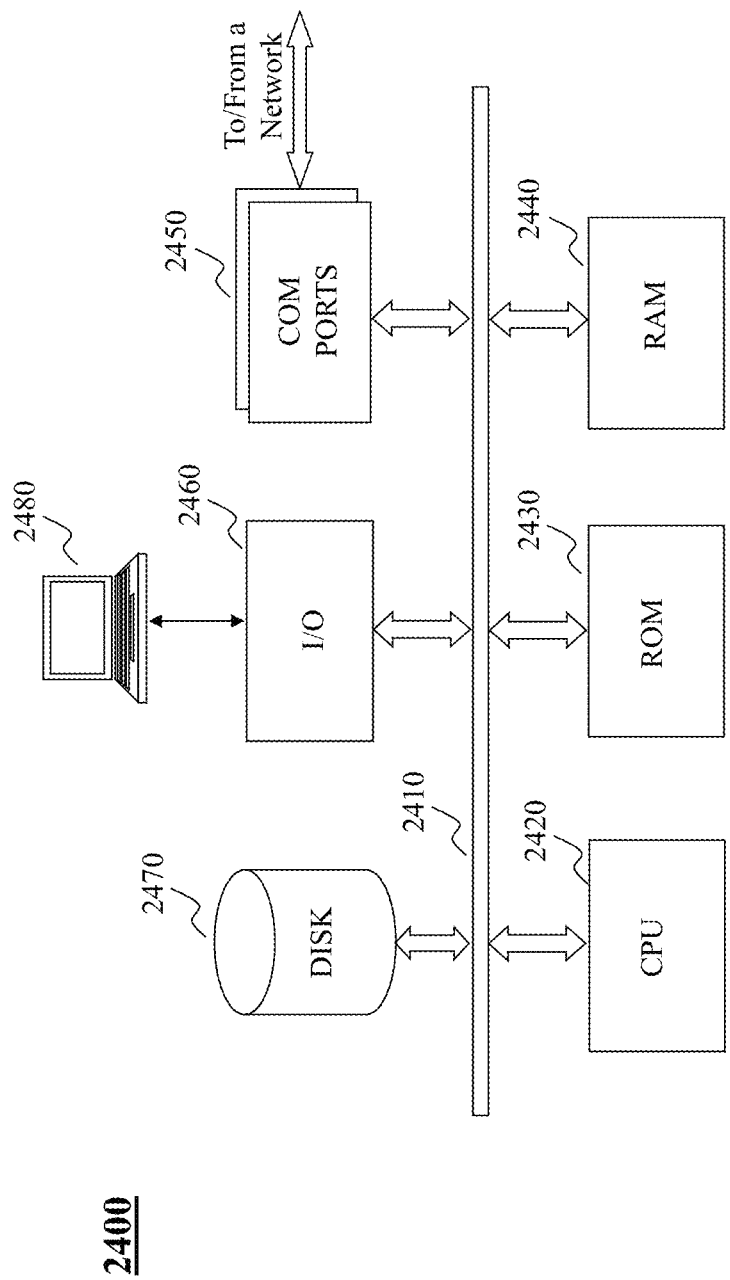
FIG. 24 is an illustrative diagram of an exemplary computing device architecture that may be used to realize a specialized system implementing the present teaching in accordance with various embodiments.

FIG. 24 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 2400 may be used to implement any component of conversation or dialogue management system, as described herein. For example, conversation management system may be implemented on a computer such as computer 2400, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 2400, for example, includes COM ports 2450 connected to and from a network connected thereto to facilitate data communications. Computer 2400 also includes a central processing unit (CPU) 2420, in the form of one or more processors, for executing program instructions. The exemplary computer platform includes an internal communication bus 2410, program storage and data storage of different forms (e.g., disk 2470, read only memory (ROM) 2430, or random access memory (RAM) 2440), for various data files to be processed and/or communicated by computer 2400, as well as possibly program instructions to be executed by CPU 2420. Computer 1300 also includes an I/O component 2460, supporting input/output flows between the computer and other components therein such as user interface elements 2480. Computer 2400 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communication platform capable of connecting to a network for speech recognition, the method comprising:
   receiving an audio signal representing a speech of a user engaged in a dialogue and a visual signal capturing the user uttering the speech;
   obtaining a first speech recognition result by
      identifying phonemes from the audio signal,
      performing audio based speech recognition based on the phonemes to generate the first speech recognition result, and
      converting the phonemes into a first set of visemes;
   obtaining a second speech recognition result by
      identifying a second set of visemes based on at least one of lip shape and movement of the user detected from the visual signal, and
      performing lip reading based speech recognition to generate the second speech recognition result based on the second set of visemes; and
   generating an integrated speech recognition result based on the first and second set of visemes, wherein
      the first speech recognition result is selected as the integrated speech recognition result if a similarity between the first and second speech recognition results satisfies a first criterion, and
      the second speech recognition result is selected as the integrated speech recognition result if the similarity satisfies a second criterion.

2. The method of claim 1, wherein
the first speech recognition result includes a first plurality of words obtained via the phonemes; and
the second speech recognition result includes a second plurality of words obtained via the second set of visemes.

3. The method of claim 1, further comprising synchronizing the first speech recognition result and the second speech recognition result, wherein each of the phonemes in the first speech recognition result is synchronized with a corresponding viseme in the second set of visemes of the second speech recognition result.

4. The method of claim 3, wherein the similarity between the first and second speech recognition results is determined by:
   determining, pairs of visemes, each of which includes one from the first set of visemes converted from the phonemes and a corresponding one from the second set of visemes that is synchronized with a corresponding phoneme from which the one viseme in the pair is converted;
   assessing the similarity between the first and second speech recognition results based on the pairs of visemes.

5. The method of claim 1, wherein the integrated speech recognition is given a confidence score, determined based on whether the first or second speech recognition result is selected.

6. Machine readable and non-transitory medium having information recorded thereon for speech recognition, wherein the information, when read by the machine, causes the machine to perform:
receiving an audio signal representing a speech of a user engaged in a dialogue and a visual signal capturing the user uttering the speech;
obtaining a first speech recognition result by
identifying phonemes from the audio signal,
performing audio based speech recognition based on the phonemes to generate the first speech recognition result, and
converting the phonemes into a first set of visemes;
obtaining a second speech recognition result by
identifying a second set of visemes based on at least one of lip shape and movement of the user detected from the visual signal, and
performing lip reading based speech recognition to generate the second speech recognition result based on the second set of visemes; and
generating an integrated speech recognition result based on the first and second set of visemes, wherein
the first speech recognition result is selected as the integrated speech recognition result if a similarity between the first and second speech recognition results satisfies a first criterion, and
the second speech recognition result is selected as the integrated speech recognition result if the similarity satisfies a second criterion.

7. The medium of claim 6, wherein
the first speech recognition result includes a first plurality of words obtained via the phonemes; and
the second speech recognition result includes a second plurality of words obtained via the second set of visemes.

8. The medium of claim 6, further comprising synchronizing the first speech recognition result and the second speech recognition result, wherein each of the phonemes in the first speech recognition result is synchronized with a corresponding viseme in the second set of visemes of the second speech recognition result.

9. The medium of claim 8, wherein the similarity between the first and second speech recognition results is determined by:
determining, pairs of visemes, each of which includes one from the first set of visemes converted from the phonemes and a corresponding one from the second set of visemes that is synchronized with a corresponding phoneme from which the one viseme in the pair is converted;
assessing the similarity between the first and second speech recognition results based on the pairs of visemes.

10. The medium of claim 6, wherein the integrated speech recognition is given a confidence score, determined based on whether the first or second speech recognition result is selected.

11. A system for speech recognition, comprising:
a sensor data collection unit configured for receiving an audio signal representing a speech of a user engaged in a dialogue and a visual signal capturing the user uttering the speech;
an audio based speech recognition unit configured for obtaining a first speech recognition result by
identifying phonemes from the audio signal,
performing audio based speech recognition based on the phonemes to generate the first speech recognition result, and
converting the phonemes into a first set of visemes;
a lip reading based speech recognizer configured for obtaining a second speech recognition result by
identifying a second set of visemes based on at least one of lip shape and movement of the user detected from the visual signal, and
performing lip reading based speech recognition to generate the second speech recognition result based on the second set of visemes; and
an audio-visual speech recognition integrator configured for generating an integrated speech recognition result based on the first and second set of visemes, wherein
the first speech recognition result is selected as the integrated speech recognition result if a similarity between the first and second speech recognition results satisfies a first criterion, and
the second speech recognition result is selected as the integrated speech recognition result if the similarity satisfies a second criterion.

12. The system of claim 11, wherein
the first speech recognition result includes a first plurality of words obtained via the phonemes; and
the second speech recognition result includes a second plurality of words obtained via the second set of visemes.

13. The system of claim 11, further comprising a synchronization unit configured for synchronizing the first speech recognition result and the second speech recognition result, wherein each of the phonemes in the first speech recognition result is synchronized with a corresponding viseme in the second set of visemes of the second speech recognition result.

14. The system of claim 13, wherein the audio-visual speech recognition integrator is configured for:
determining, pairs of visemes, each of which includes one from the first set of visemes converted from the phonemes and a corresponding one from the second set of visemes that is synchronized with a corresponding phoneme from which the one viseme in the pair is converted;
assessing the similarity between the first and second speech recognition results based on the pairs of visemes.

15. The system of claim 11, wherein the integrated speech recognition is given a confidence score, determined based on whether the first or second speech recognition result is selected.

\* \* \* \* \*